US006804408B1

United States Patent
Gallagher et al.

(10) Patent No.: US 6,804,408 B1
(45) Date of Patent: Oct. 12, 2004

(54) METHOD FOR ENHANCING A DIGITAL IMAGE WITH NOISE-DEPENDENT CONTROL OF TEXTURE

(75) Inventors: Andrew C. Gallagher, Rochester, NY (US); Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/470,729

(22) Filed: Dec. 22, 1999

(51) Int. Cl.[7] .................................................. G06T 5/00
(52) U.S. Cl. ........................ 382/272; 382/274; 382/275
(58) Field of Search ................................ 382/254, 263, 382/264, 266, 272, 274, 275, 261

(56) References Cited

U.S. PATENT DOCUMENTS

| | | | |
|---|---|---|---|
| 4,591,923 A | 5/1986 | Urabe et al. ................. 358/284 |
| 4,794,531 A | 12/1988 | Morishita et al. ...... 364/413.13 |
| 4,945,502 A | * | 7/1990 | Kwon et al. ................. 364/574 |
| 5,038,388 A | 8/1991 | Song ............................. 382/54 |
| 5,081,692 A | 1/1992 | Kwon et al. ................... 382/54 |
| 5,111,285 A | * | 5/1992 | Fujita et al. .................. 358/75 |
| 5,134,503 A | 7/1992 | Kimura ....................... 358/447 |
| 5,641,596 A | * | 6/1997 | Gray et al. .................... 430/21 |
| 5,923,775 A | 7/1999 | Snyder et al. ............... 382/172 |
| 6,295,382 B1 | * | 9/2001 | Karanovic ................... 382/261 |

FOREIGN PATENT DOCUMENTS

| | | | |
|---|---|---|---|
| EP | 0 851 666 A3 | 7/1998 | .......... H04N/1/409 |
| EP | 0 851 666 A2 | 7/1998 | .......... H04N/1/409 |

OTHER PUBLICATIONS

U.S. patent application Ser. No. 09/324,239, Gallagher et al., filed Jun. 2, 1999.

"Rational unsharp masking technique" by Giovanni Ramponi and Andrea Polesei. Journal of Electronic Imaging, Apr. 1998, vol. 7(2), pp. 333–338.

* cited by examiner

*Primary Examiner*—Brian Werner
(74) *Attorney, Agent, or Firm*—David M. Woods

(57) ABSTRACT

A method is described for enhancing a digital image channel, e.g., a channel comprising a texture signal, by providing a predetermined estimate of the noise expected for the digital channel based on a predetermined relationship between the image intensity values and the expected noise for given intensities. After a local estimate of signal activity is generated for the digital image channel, a gain adjustment is generated from the predetermined estimate of noise and the local estimate of signal activity; the gain adjustment is applied to the image pixels in the digital channel in order to generate a digital channel with enhanced image values.

30 Claims, 12 Drawing Sheets

METHOD FOR ENHANCING A DIGITAL IMAGE WITH NOISE-DEPENDENT CONTROL OF TEXTURE

FIELD OF THE INVENTION

The invention relates generally to the field of digital image processing and, more particularly, to a method for enhancing the texture of a digital image.

BACKGROUND OF THE INVENTION

Traditional methods of increasing the apparent sharpness of a digital image, such as the technique of unsharp masking, often produce unwanted artifacts at large transition edges in the image. For example, unsharp masking is often described by the equation:

$$Sproc=Sorg+B(Sorg-Sus)$$

where Sproc represents the processed image signal in which the high frequency components have been amplified, Sorg represents the original image signal, Sus represents the unsharp image signal, typically a smoothed image signal obtained by filtering the original image, and B represents the high frequency emphasis coefficient.

The unsharp masking operation may be modeled as a linear system. Thus, the magnitude of any frequency in Sproc is directly dependent upon the magnitude of that frequency in the Sorg image signal. As a consequence of this superposition principle, large edges in the Sorg image signal will often display a ringing artifact in the Sproc signal when the desired level of high frequency enhancement has been performed in other areas of the Sproc signal. This ringing artifact appears as a light or dark outline around the large edge, and may be visually objectionable.

Many non-linear filters based on local statistics exist for the purposes of noise reduction, sharpening, and contrast adjustment. For example, the median filter is well known in the art. In this filter, typically implemented for noise reduction, each pixel is replaced with the median value of some surrounding neighborhood. This filtering process is generally very successful at removing impulse noise; however, the processed image appears slightly less sharp than the original.

Another example of a non-linear filter based on local statistics is local histogram equalization, referred to as adaptive histogram modification by William Pratt on pages 278–284 of the book *Digital Image Processing, Second Edition*, John Wiley & Sons, 1991. With this filter, the values of pixels are modified by the cumulative histogram of a local window. This technique effectively adjusts the contrast of each region of a digital image, effectively increasing the local contrast in some regions of the image, and decreasing the contrast in other regions. This technique does not intend to increase the apparent sharpness of any given region. Also, this technique does not ensure that the typical artifacts of ringing will not occur.

There exist many algorithms for sharpening the appearance of images without generating artifacts or enhancing the notability of noise. In U.S. Pat. No. 4,571,635, Mahmoodi and Nelson teach the method of deriving an emphasis coefficient B that is used to scale the high frequency information of the digital image depending upon the standard deviation of image pixel values in a local neighborhood. In addition, in U.S. Pat. No. 5,081,692, Kwon and Liang teach that the emphasis coefficient B is based upon a center weighted variance calculation. However, neither Mahmoodi et al nor Kwon et al consider the expected standard deviation of noise inherent in the imaging system. By not considering the noise inherent in the imaging system, both Mahmoodi and Kwon make the implicit assumption that all imaging sources and intensities have the same noise characteristics. In addition, neither use separate strategies for texture and edge regions.

In U.S. Pat. No. 4,794,531, Morishita et al teaches a method of generating the unsharp image with a filter whose weights on neighboring pixels are based upon the absolute difference between the central pixel and the neighboring pixel. Morishita claims that this method effectively reduces artifacts seen at the edges of a sharpened image (as compared with traditional unsharp masking). In addition, Morishita sets a gain parameter based upon local standard deviation and the standard deviation of the entire image. Again, Morishita does not consider the levels of noise inherent in the imaging system in order to approximate signal to noise ratios. In addition, the method of Morishita does not offer explicit control over the amount of edge reshaping.

In U.S. Pat. No. 5,038,388, Song teaches a method of amplifying image details without amplifying the image noise by adaptively amplifying the high-frequency component of the image. An estimate of image noise power is used, however; this noise power is not described as being dependent on the intensity or the pixel. In addition, Song does not attempt to estimate signal to noise ratio in order to control the level of sharpening.

Thus, there exists a need for an alternative method of manipulating a digital image in order to generate an image signal that appears to be sharper, or more in focus, while minimizing the ringing artifact that is evident with the unsharp masking technique and enhancing the magnitude of detail in the scene in a noise sensitive manner.

SUMMARY OF THE INVENTION

It is an object of this invention to allow for independent control of the enhancement applied to detail, large edges, and noisy regions.

The present invention is directed to overcoming one or more of the problems set forth above. Briefly summarized, according to one aspect of the present invention, the invention resides in a method for enhancing a digital image channel, e.g., a channel comprising a texture signal, by providing a predetermined estimate of the noise expected for the digital channel based on a predetermined relationship between the image intensity values and the expected noise for given intensities. After a local estimate of signal activity is generated for the digital image channel, a gain adjustment is generated from the predetermined estimate of noise and the local estimate of signal activity; and the gain adjustment is applied to the image pixels in the digital channel in order to generate a digital channel with enhanced image values.

The present invention has the advantage of boosting the texture signal by a factor that is related to an estimate of the local signal to noise (SNR) ratio. Thus, the portion of the texture signal coincident with regions of the digital image channel having high SNR, such as the modulation of a grassy field due to many blades of grass in addition to image system noise, will experience a greater level of boost as compared with the portion of the texture signal associated with low SNR regions of the digital image channel, such as a large region of clear blue sky where the only modulation is likely to be noise resulting from the imaging system. Therefore, while it is not desirable to increase the amplitude of regions having only noise modulation, it is preferable to boost the modulation where it can be attributed to actual modulation in the scene. In the present invention, the signal to noise ratio functions as a classifier that may be used to distinguish between, e.g., the two aforementioned types of regions in a scene.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described as a method implemented as a software program. Those skilled in the art will readily recognize that the equivalent of such software may also be constructed in hardware. Because image enhancement algorithms and methods are well known, the present description will be directed in particular to algorithm and method steps forming part of, or cooperating more directly with, the method in accordance with the present invention. Other parts of such algorithms and methods, and hardware and/or software for producing and otherwise processing the image signals, not specifically shown or described herein may be selected from such materials, components and elements known in the art. Given the description as set forth in the following specification, all software implementation thereof is conventional and within the ordinary skill in such arts.

It is instructive to note that the present invention utilizes a digital image which is typically a two-dimensional array of red, green, and blue pixel values or of single monochrome pixel values corresponding to light intensities. In addition, the preferred embodiment is described with reference to an image of 1024 rows of pixels and 1536 lines of pixels, although those skilled in the art will recognize that digital images of different resolutions and dimensions may be used with equal, or at least acceptable, success. With regard to matters of nomenclature, the value of a pixel of a digital image located at coordinates (x,y), referring to the $x^{th}$ row and the $y^{th}$ column of the digital image, shall herein comprise a triad of values [r(x,y), g(x,y), b(x,y)] respectively referring to the values of the red, green and blue digital image channels at location (x,y). In this regard, a digital image may be considered as comprising a certain number of digital image channels. In the case of a digital image comprising red, green and blue two-dimensional arrays, the image comprises three channels, namely, red, green and blue channels. Additionally, a luminance channel n may be formed from the color signals. The value of a pixel of a digital image channel n located at coordinates (x,y), referring to the $x^{th}$ row and the $y^{th}$ column of the digital image channel, shall herein be a single value referred to as n(x,y).

Figure 1:
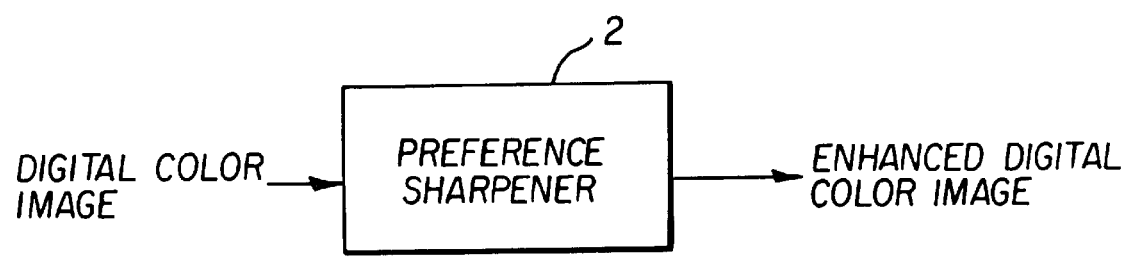
FIG. 1 is a block diagram illustrating an overview of the present invention.

Referring to the overview of the invention shown in FIG. 1, a digital image is input to a preference sharpener 2, which sharpens the input digital image for the preference of an operator. The purpose of the preference sharpener 2 is to enhance the detail present in the digital image without enhancing noise or creating artifacts. This purpose is accomplished by a process that decomposes a digital image channel into a signal corresponding to the image detail, a signal corresponding to the image edges, and a signal corresponding to the image signal to noise ratio (SNR), as will be described in detail hereinbelow. This decomposition and creation of separate signals allows for independent control of the enhancement applied to detail, large edges, and noisy regions. The output of the preference sharpener 2 comprises a digital image that, in accordance with the invention, appears sharper and more natural than can be achieved with traditional means of sharpening a digital image.

Figure 2:
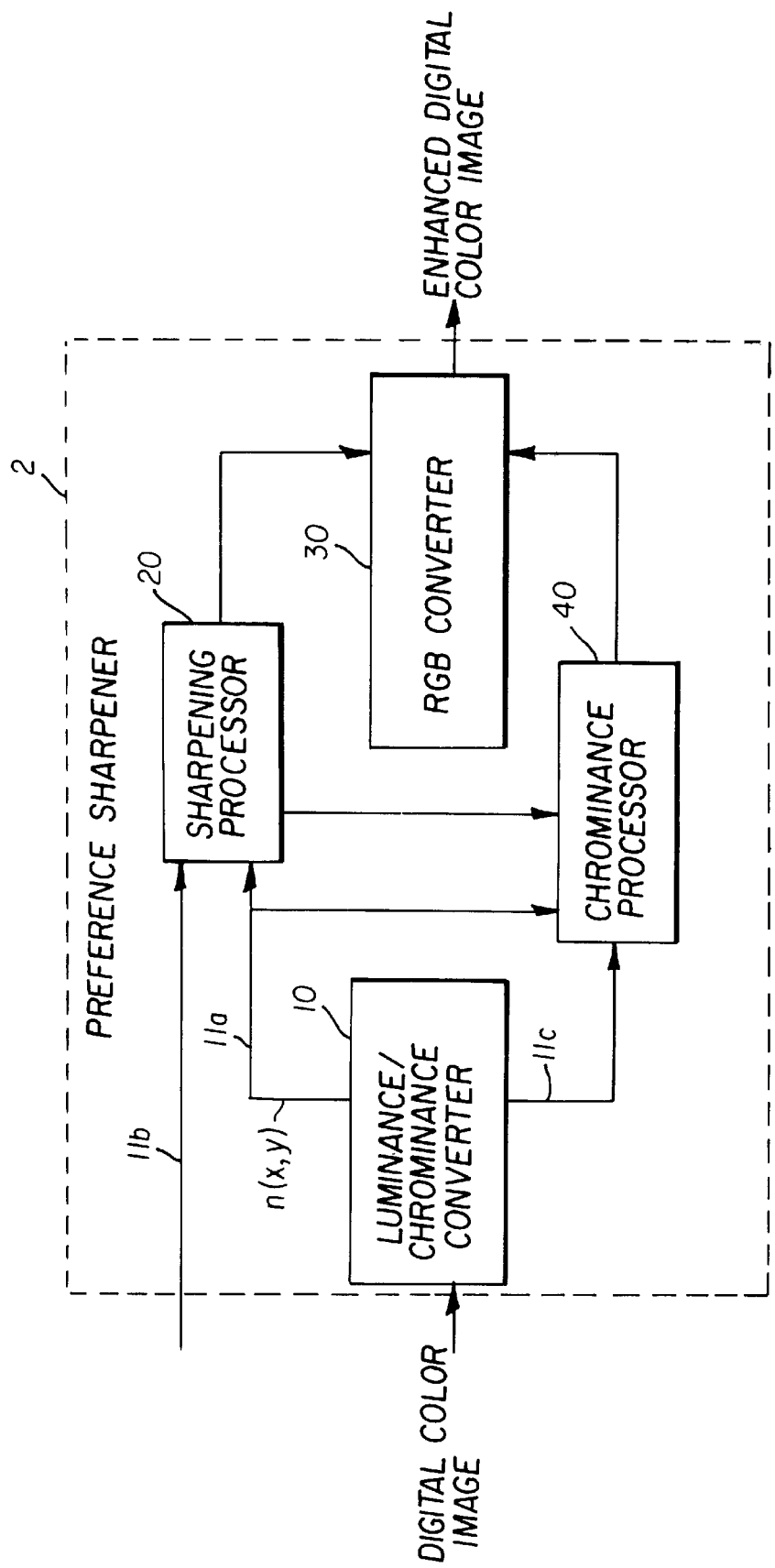
FIG. 2 is a block diagram of the preference sharpener in FIG. 1 in more detail.

FIG. 2 shows a block diagram of the preference sharpener 2. The digital color image and noise information (in the form of a noise table 6) are input to the preference sharpener 2. The noise information is input in the form of a luminance table. The digital image is input to a luminance/chrominance converter 10 in order to generate a luminance digital image channel n(x,y) and two chrominance digital image channels g(x,y) and i(x,y). The luminance digital image channel n(x,y) and the luminance noise table are input over respective lines 11a and 11b to a sharpening processor 20 for enhancing the digital image channel n(x,y) based on knowledge of the system noise. The transformation performed in the converter 10 from the digital color image, typically in an RGB space comprising separate red, green and blue image channels, to a luminance-chrominance color space is done by means of a color space matrix transformation, which results in the luminance digital image channel n(x,y) and the two chrominance digital image channels g(x,y) and i(x,y),as is well known in the art. In the preferred embodiment, the matrix transformation to the luminance-chrominance space may be described with the following equation:

$$\begin{bmatrix} n(i,j) \\ g(i,j) \\ i(i,j) \end{bmatrix} = \begin{bmatrix} 1/3 & 1/3 & 1/3 \\ -1/4 & 1/2 & -1/4 \\ -1/2 & 0 & 1/2 \end{bmatrix} \begin{bmatrix} r(i,j) \\ g(i,j) \\ b(i,j) \end{bmatrix} \quad (A1)$$

Equation A1 provides a matrix rotation from RGB space into a luminance-chrominance space in order to isolate a single channel upon which the tone scale function (to be described) can operate. For example, a film scanner records (for each pixel) the red, green and blue printing density at that point. These three values can be thought of as a pixel's location in three-dimensional space. The converter 10 performs an axis rotation as shown in equation A1, which provides for a neutral axis, upon which R=G=B, and two color difference axes, green-magenta and illuminant.

The noise table input to the sharpening processor 20 provides the relationship between the signal intensity level i and the expected amount of noise $\sigma_N(i)$ for that intensity level. In the preferred embodiment, as will be described in more detail, the noise table is a two column table, wherein the first column represents an intensity level i and the second column represents the expected standard deviation of noise $\sigma_n(i)$ for that intensity level.

The chrominance digital image channels g(x,y) and i(x,y) are input over a line 11c to a chrominance processor 40 and may be adjusted as desired. For instance, the action of the chrominance processor 40 may be to scale the chrominance image channels by a constant greater than 1.0 in order to increase their apparent saturation. The operation of the chrominance processor is not of particular relevance to the present invention, and consequently it will not be discussed further, except to note that, in the present embodiment, the output of the chrominance processor 40 is maintained identical to its input.

The digital image channels output from the sharpening processor 20 and the digital image channels output from the chrominance processor 40 are input to an RGB converter 30 for conversion back to a digital image composed of a red, green, and blue digital image channels. This conversion is again accomplished with a matrix rotation (i.e., the inverse of the previous color rotation matrix performed by the converter 10). Inverting a 3 by 3 matrix is well known in the art and will not be further discussed. The output of the RGB converter 30 is a digital image that has been sharpened for the preference of the operator.

As described in the preferred embodiment, the sharpening processor 20 operates upon only a luminance digital image channel. However, as an alternative embodiment, the sharpening processor could be applied to each of the red, green, and blue digital image channels. In this case, the digital color image signals (which are RGB signals) would be directly applied to the sharpening processor 20.

Figure 3:
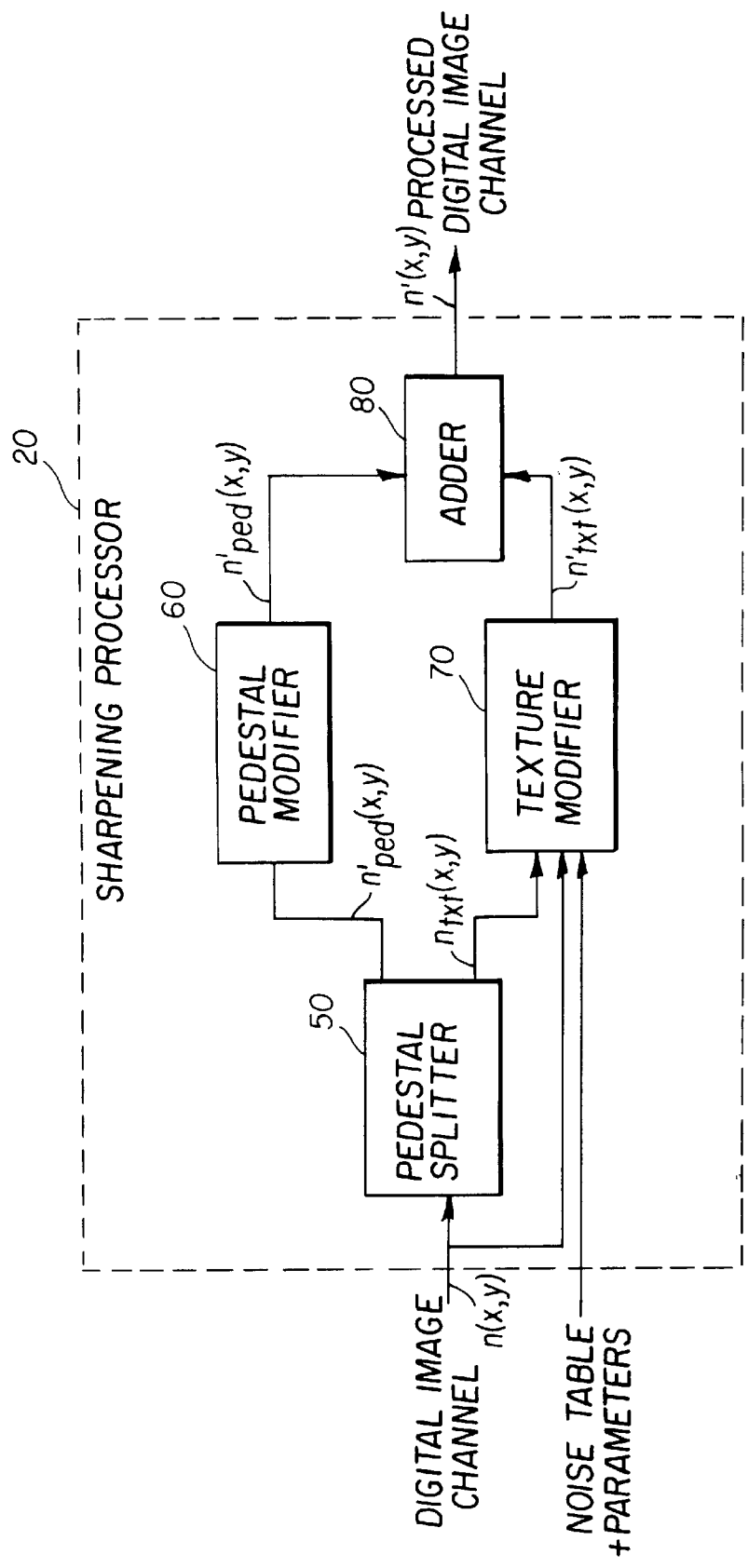
FIG. 3 is a block diagram of a first embodiment of the sharpening processor shown in FIG. 2.

In FIG. 3, which illustrates a block diagram of the sharpening processor 20, the digital image channel n(x,y) is shown to be divided into two portions by a pedestal splitter 50, that is, into a pedestal signal and a texture signal. The preferred embodiment of the pedestal splitter 50, shown in FIG. 5, outputs a texture signal $n_{txt}(x,y)$ and a pedestal signal $n_{ped}(x,y)$. The texture signal $n_{txt}(x,y)$ primarily contains the detail of the image, as well as the image noise. The pedestal signal $n_{ped}(x,y)$ is a conceptually smooth signal, except at regions of the image containing large occlusion boundaries, where the pedestal signal contains the transition edge. An alternative embodiment of the pedestal splitter 50, shown in FIG. 5A, essentially comprises a linear FIR filter. In this alternative embodiment, the pedestal signal $n_{ped}(x,y)$ is essentially equivalent to a lowpass signal and the texture signal $n_{txt}(x,y)$ is essentially equivalent to a highpass signal. Since other spatial frequency divisions are possible, those skilled in the art will understand that the present invention will yield beneficial results for any number of definitions of texture signals and pedestal signals.

Referring again to FIG. 3, the digital image channel n(x,y), the texture signal $n_{txt}(x,y)$ and the noise table 6 are input to a texture modifier 70. The purpose of the texture modifier 70 is to enhance the magnitude of detail in the scene in a noise sensitive manner. An estimate of the local signal/noise ratio (SNR) is made using information about the expected standard deviation of noise for a given intensity level as supplied by the noise table. This estimate of the local SNR is used to set the boost factor relating to the level of enhancement given to a local level of the texture signal. This procedure will be described in detail hereinbelow. The output of the texture modifier 70 is an enhanced texture signal $n'_{txt}(x,y)$. Furthermore, the pedestal signal $n_{ped}(x,y)$ is input to a pedestal modifier 60 for the purpose of increasing edge contrast to make the edges appear to have greater clarity and sharpness. The purpose of the pedestal modifier 60 is to enhance the image edges without producing artifacts. The method employed by the pedestal modifier 60 will be described in detail hereinbelow. The output of the pedestal modifier is an enhanced pedestal signal $n'_{ped}(x,y)$.

The outputs of the pedestal modifier 60 and the texture modifier 70 are input to an adder 80, which adds the enhanced texture signal $n'_{txt}(x,y)$ and the enhanced pedestal signal $n'_{ped}(x,y)$ together in order to produce the digital image channel output from the sharpening processor 20. The enhanced digital image channel n'(x,y) may be expressed as $$n'(x,y)=n'_{txt}(x,y)+n'_{ped}(x,y)$$

Figure 4:
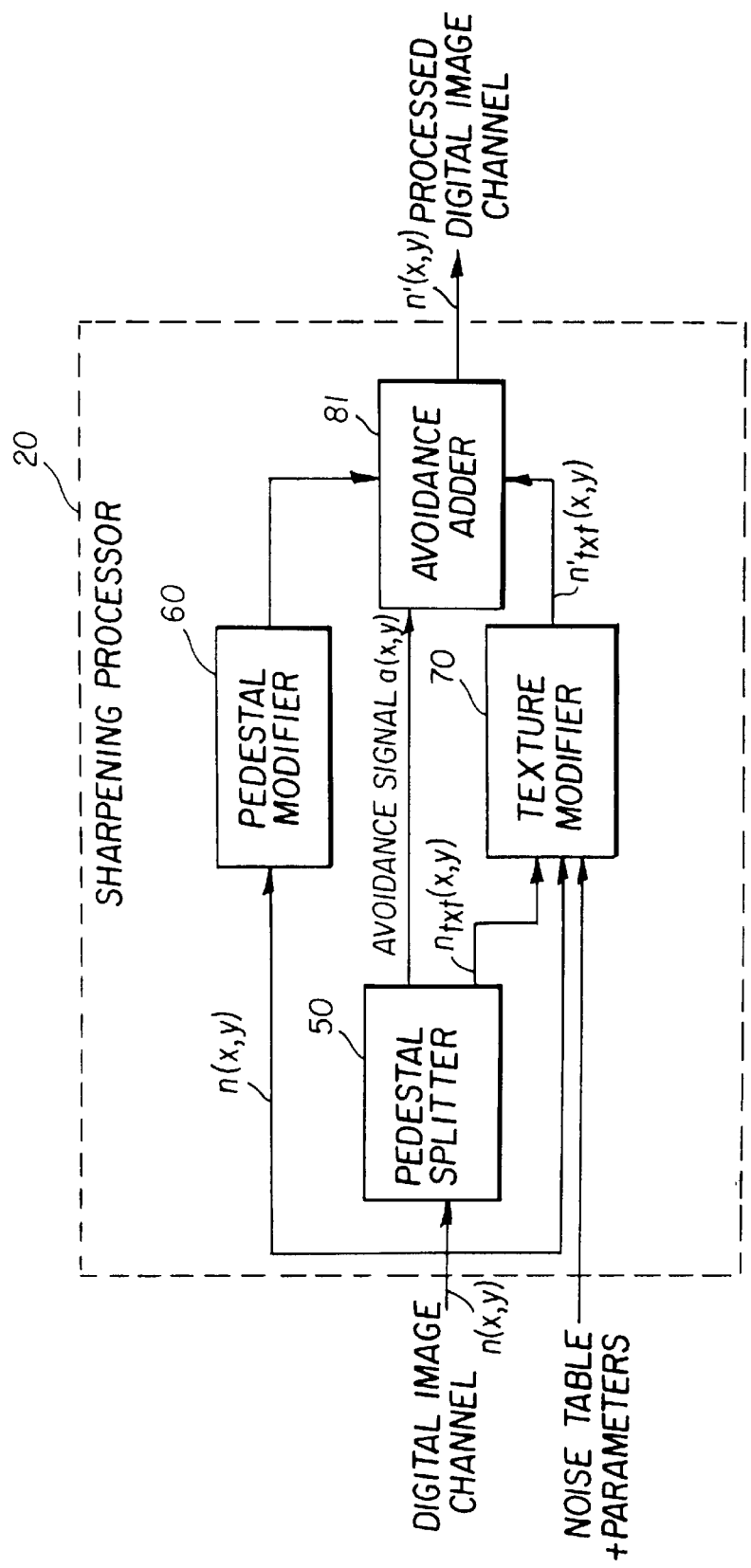
FIG. 4 is a block diagram of a second embodiment of the sharpening processor shown in FIG. 2.

FIG. 4 shows an alternative embodiment of the sharpening processor 20, illustrating that minor perturbations to the arrangement of the components often have only a slight effect on the output of the sharpening processor 20. In this regard, the pedestal splitter 50 outputs the texture signal $n_{txt}(x,y)$ and an avoidance signal a(x,y). The avoidance signal a(x,y) is an intermediate signal calculated by the pedestal splitter 50 for determining the location of edges in the image. The derivation of this signal will be described below. The value of the avoidance signal ranges from 0.0 to 1.0. Image locations (x,y) having a value of the avoidance signal a(x,y)=0.0 correspond with edge regions of the image; conversely, image locations (x,y) having a value of the avoidance signal a(x,y)>0.0 correspond with regions of image detail or noise. As mentioned before, it is an object of this invention to allow for independent control of the enhancement applied to detail, large edges, and noisy regions. Thus, in the digital image channel output from the sharpening processor 20, it is desired that the edges (where a(x,y)=0) be enhanced by the pedestal modifier 60, and that the regions of image detail or noise (corresponding to those locations where a(x,y)>0.0) be enhanced by the texture modifier 70.

To this end, the digital image channel n(x,y) is input to the pedestal modifier 60 and as before the texture signal $n_{txt}(x,y)$ is input to the texture modifier 70. The two resulting outputs from the pedestal modifier 60 and the texture modifier 70, the enhanced texture signal $n'_{txt}(x,y)$ and the enhanced pedestal signal $n'_{ped}(x,y)$, are input to an avoidance adder 81. The avoidance adder 81 requires three inputs: the two signals $n'_{txt}(x,y)$ and $n'_{ped}(x,y)$ to be summed, and the artifact avoidance signal (a(x,y)). The two signals to be summed undergo a transformation such that one of the signals to be summed is multiplied by a(x,y), and the other is multiplied by (1−a(x,y)). The two transformed signals are then added. The signal input which is scaled by a(x,y) is known as the "a(x,y) input" of the avoidance adder 81 and the signal input which is scaled by (1−a(x,y)) is known as the "(1−a(x,y))" input of the avoidance adder 81. In the case of the present embodiment of the sharpening processor 20, the signal output from the avoidance adder can be expressed as:

$$n'(x,y)=a(x,y)n_{txt}(x,y)+(1-a(x,y))n_{ped}(x,y)$$

Figure 5:
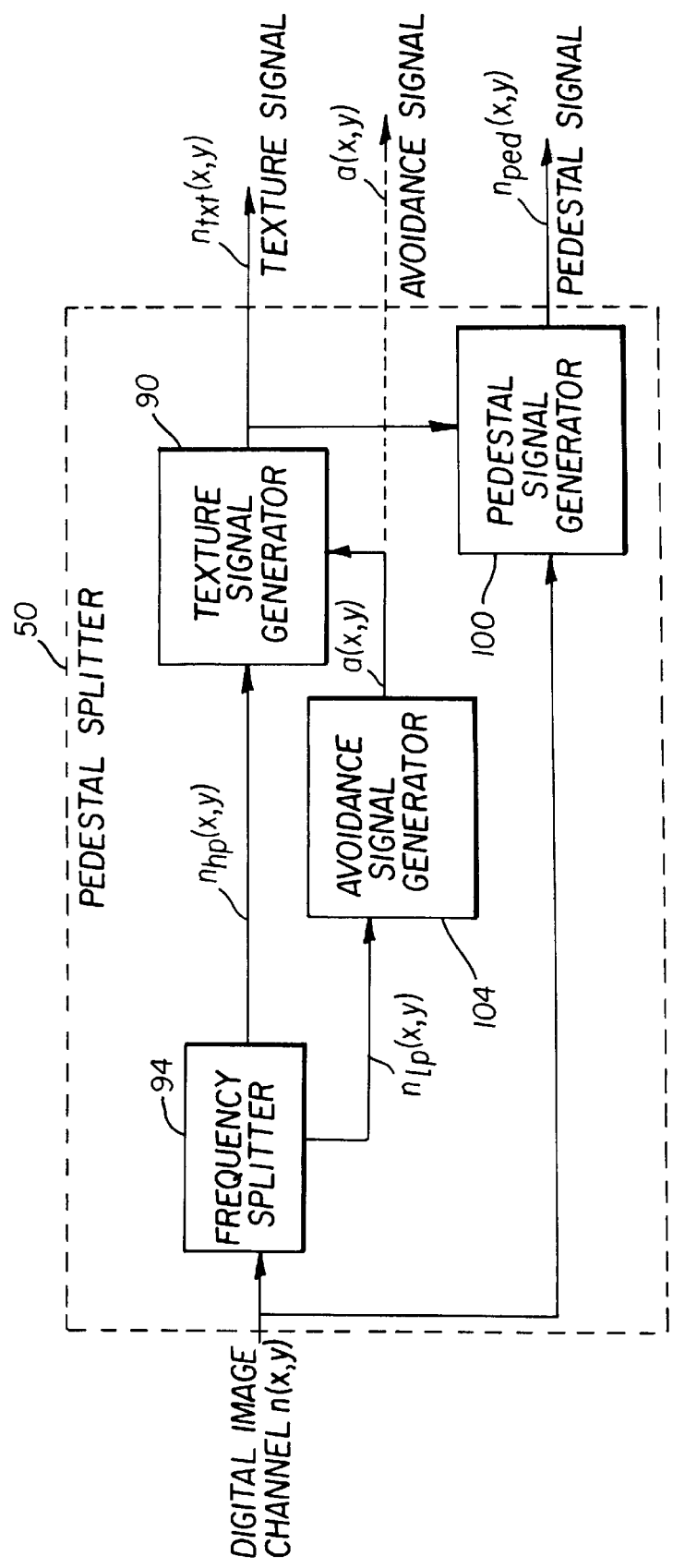
FIG. 5 is a block diagram of a first embodiment of the pedestal splitter shown in FIG. 3.

Referring to FIG. 5, the digital image channel n(x,y) input into the pedestal splitter 50 is split into a high pass signal $n_{hp}(x,y)$ and a low pass signal $n_{lp}(x,y)$ by a frequency splitter 94. Although there are many known techniques for generating highpass and lowpass signals, the frequency splitter is preferably implemented with a Gaussian filter having a standard deviation (sigma) of 0.9 pixels. The preferred value of the standard deviation of the Gaussian filter may vary with image size. The value of 0.9 pixels for the standard deviation was derived by optimizing the present invention with 1024 by 1536 pixel size images. This Gaussian filter is a two dimensional circularly symmetric low-pass filter whose filter coefficients may be derived by the following formula which is well known in the art:

$$g(i,j)=1/(sigma\ sqrt(2\pi))\ exp[-(i^2+j^2)/(2\ sigma^2)]$$

Where $g(i,j)$=the Gaussian filter coefficient at the $(i,j)^{th}$ pixel sigma =the standard deviation of the Gaussian filter (0.9)

$\pi$=the constant approximately 3.1415 . . .

In the preferred embodiment, i and j range from −3 to +3, inclusive, for a total of 49 coefficients for the filter g(i,j). Note that another technique, well known in the art, exists for separating a Gaussian filter into horizontal and vertical components for subsequent application for the purpose of computational cost reduction. In either case, the frequency splitter 94 applies the Gaussian filter g(i,j) to the digital image channel n(x,y) by the process of convolution, which is well known in the art. The convolution may be expressed as:

$$n_{lp}(x,y)=\Sigma\Sigma n(x-i,y-j)g(i,j)$$

with the summations occurring over all i and j. The signal $n_{lp}(x,y)$ resulting from this convolution process is the low-pass signal. The low-pass signal is output from the frequency splitter 94. In addition, the high-pass signal $n_{hp}(x,y)$ is output from the frequency splitter 94 after having been derived by the following relationship:

$$n_{hp}(x,y)=n(x,y)-n_{lp}(x,y)$$

The low-pass signal $n_{lp}(x,y)$ is input into an avoidance signal generator 104 for forming the avoidance signal a(x,y), as will be described in detail below. A texture signal generator 90 receives both the high-pass signal $n_{hp}(x,y)$ and the avoidance signal a(x,y) and both signals are multiplied therein for producing the texture signal $n_{txt}(x,y)$. Thus, the texture signal $n_{txt}(x,y)$ may be expressed as:

$$n_{txt}(x,y)=a(x,y)*n_{hp}(x,y).$$

The texture signal $n_{txt}(x,y)$ computed by the texture signal generator 90 is then output by the pedestal splitter 50. In addition, as shown in broken line in FIG. 5, the avoidance signal a(x,y) may optionally be output by the pedestal splitter 50, in particular to provide an input to the avoidance adder 81 in the alternative embodiment of the sharpening processor 20 shown in FIG. 4.

A pedestal generator 100 receives the luminance digital image channel n(x,y) and the texture signal $n_{txt}(x,y)$ and subtracts the texture signal from the luminance signal, which produces the pedestal signal $n_{ped}(x,y)$. Thus, the pedestal signal may be expressed as:

$$n_{ped}(x,y)=n(x,y)-n_{txt}(x,y).$$

The pedestal signal $n_{ped}(x,y)$ computed by the pedestal signal generator 100 is then output from the pedestal splitter 50.

Figure 5A:
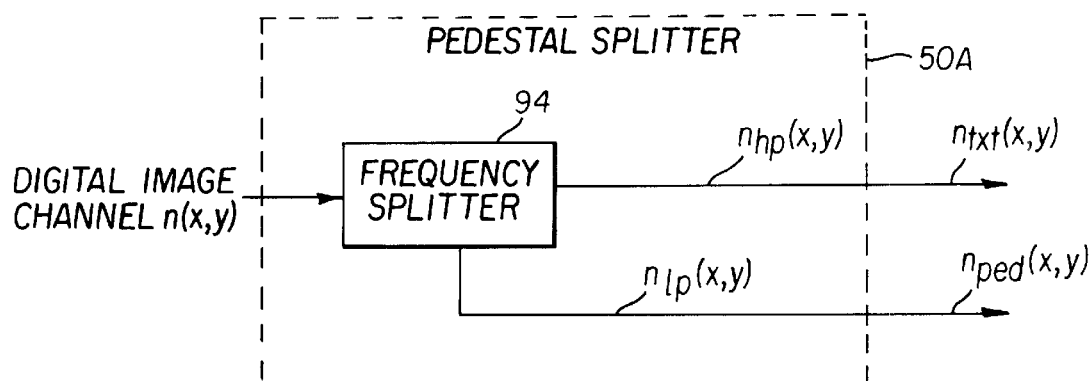
FIG. 5A is a block diagram of a second embodiment of the pedestal splitter shown in FIG. 3.

An alternative embodiment of the pedestal splitter 50 (identified as 50A) is shown in FIG. 5A. The luminance digital image channel n(x,y) input into the alternative embodiment of the pedestal splitter 50A is split into a high pass signal and a low pass signal by a frequency splitter 94 preferably with the Gaussian filter as described above having a standard deviation (sigma) of 0.9 pixels. The preferred value of the standard deviation of the Gaussian filter may vary with image size. The value of 0.9 pixels for the standard deviation was derived by optimizing the present invention with 1024 by 1536 pixel size images. The frequency splitter 94 applies the Gaussian filter g(i,j) to the digital image channel n(x,y) by the aforementioned process of convolution.

The signal $n_{lp}(x,y)$ resulting from this convolution process is the low-pass signal output from the frequency splitter 94. In addition, a high-pass signal $n_{lp}(x,y)$ is output from the frequency splitter 94 after having been derived by the following relationship:

$$n_{lp}(x,y)=n(x,y)-n_{lp}(x,y)$$

In this alternative embodiment of the pedestal splitter, the low-pass signal $n_{lp}(x,y)$ is output from the pedestal splitter as the pedestal signal $n_{ped}(x,y)$. (i.e., in this case, the pedestal signal $n_{ped}(x,y)$ is set equal to the lowpass signal $n_{lp}(x,y)$ rather than being derived with a control signal). Likewise, the texture signal $_{txt}(x,y)$ is set equal to the highpass signal $n_{lp}(x,y)$.

This alternative embodiment of the pedestal splitter 50A simply performs a digital filtering operation by convolution and outputs the highpass and lowpass signals as the texture and pedestal signals, respectively. This embodiment of the pedestal splitter 50A is simpler than the preferred embodiment 50 because no control signal is used or calculated. However, the quality of the digital image output from the preference sharpener 4 employing this alternative embodiment is inferior to the quality of the digital image output from the preference sharpener 4 employing the preferred embodiment of the pedestal splitter 50.

Those skilled in the art will recognize that there are many types of operations that may be used to generate two signals that essentially sum to generate the digital image channel. The preferred embodiment of the pedestal splitter and the alternative embodiment of the pedestal splitter are both examples of operations that may be used to separate a digital image channel into two signals that essentially sum to generate the digital image channel.

Figure 6:
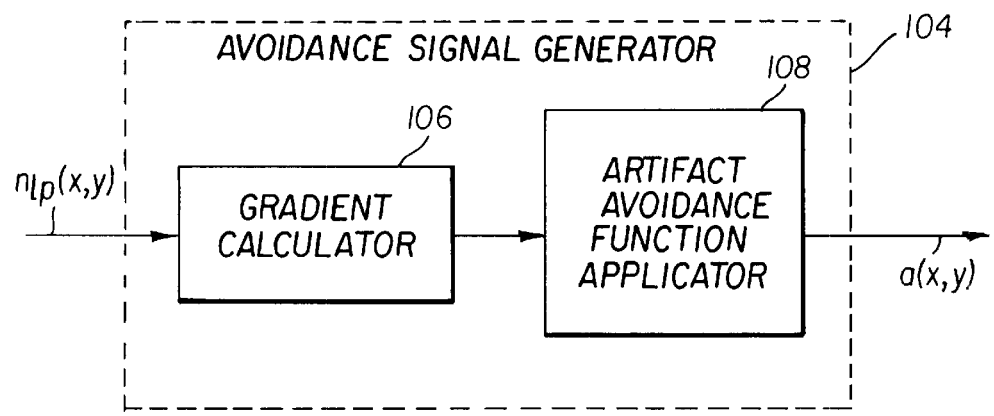
FIG. 6 is a block diagram of the avoidance signal generator shown in FIG. 5.

Referring to FIG. 6, there is illustrated a block diagram of the avoidance signal generator 104. In this regard, the low pass signal $n_{lp}(x,y)$ is input into a non-directional squared gradient calculator 106 for producing a non-directional gradient signal. This calculation is performed by first calculating the difference between the pixel and its upper vertical neighbor, as well as the difference between the pixel and its horizontal neighbor to the right. The non-directional squared gradient is the sum of the squares of these two differences. The non-directional squared gradient signal, ndg(x,y) may be expressed by the following equation:

$$ndg(x,y)=[n_{lp}(x,y)-n_{lp}(x-1,y)]^2+[n_{lp}(x,y)-n_{lp}(x,y+1)]^2$$

The value of ndg(x,y) is then mapped by an artifact avoidance function applicator 108 to produce an artifact avoidance signal a(x,y) as the output of the avoidance signal generator 104.

Referring to FIG. 6, this mapping is performed by passing the non-directional squared gradient signal, ndg(x,y), through an artifact avoidance function av(y) formed in the following manner. The preferred embodiment of the present invention utilizes an artifact avoidance function defined by:

$$av(y)=(½) (1+COS(\pi(y-C_0)/(C_1-C_0))$$

for $y>C_0$ and $y<C_1$, $$av(y)=0$$

for $y>=C_1$ and $$av(y)=1$$

for $y<=C_0$ where $C_0$ and $C_1$ are numerical constants.

Figure 7:
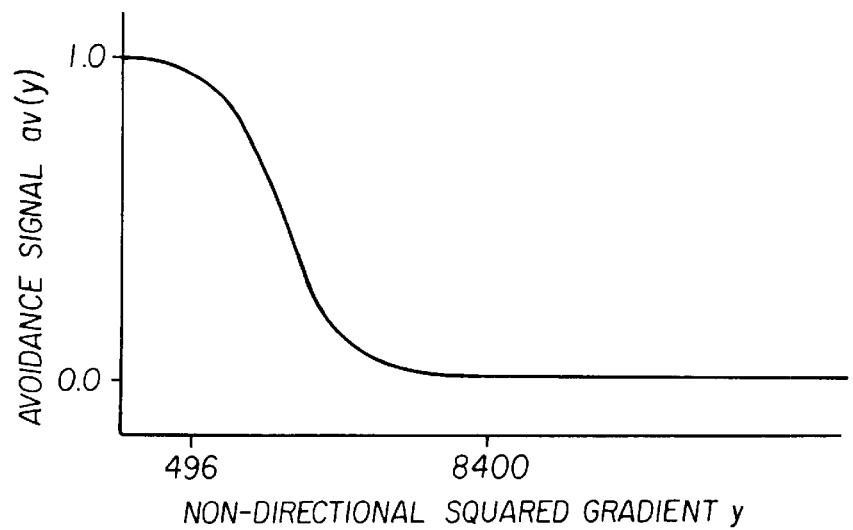
FIG. 7 is n example of an artifact avoidance function applied by the avoidance signal generator shown in FIG. 6.

The preferred values for $C_0$ and $C_1$ will vary according to the range of the input data. The input data range in the images used in the development of this preferred embodiment ranged from 0 to 4095. In this case, the preferred value for $C_0$ is 996, and the preferred value for $C_1$ is 8400. As an alternate method for constructing the artifact avoidance function is described in the following equation:

$$av(y)=1-sqrt((y-C_0)/(C_1-C_0))$$

for $y>=C_0$ and $y<=C_1$ $$av(y)=1$$

for $y<C_0$ and $$av(y)=0$$

for $y>C_1$. FIG. 7 shows an example plot of the function av(y).

Note that in the preferred embodiment, the value of $C_1$ is related to the size sigma (in standard deviations) of the Gaussian filter. The value of $C_1$ is inversely proportional to the square of sigma (in standard deviations) of the Gaussian filter. Preferably, $C_1$ may be determined by the relation:

$$C_1=6804/(sigma*sigma)$$

Also, $C_0$ is related to $C_1$ by the equation:

$$C_0=0.127C_1-18$$

The artifact avoidance signal, a(x,y), is generated by the artifact avoidance function applicator 108. This is accomplished by applying the artifact avoidance function av(y), to the non-directional gradient signal ndg(x,y), as shown in FIG. 7. The mathematical result is described by the equation:

$$a(x,y)=av(ndg(x,y))$$

The artifact avoidance function shown in FIG. 7 is most efficiently implemented as a look-up-table (LUT).

It is helpful to understand that the avoidance signal a(x,y) is an example of a control signal created from a spatially filtered version of the digital image channel. To begin with, a generalized linear spatial filter is described by the equation $$c(x,y)=\Sigma\Sigma d(x-i,y-j)g(i,j)$$

where the d(x−i,y−j) values represent local pixel values surrounding the $(x,y)^{th}$ pixel and the g(i,j) values represent numerical coefficients of a digital filter that do not depend on the pixel values. A non-linear spatial filter herein described shall be defined as a spatial filter which cannot be described by the linear spatial filter equation. The output of applying a generalized control signal to an input signal bears a multiplicative relationship to the input signal. An example of applying a control signal is given by the equation:

$$c(x,y)=h(x,y)d(x,y)$$

where the d(x,y) values represent the input signal $(x,y)^{th}$ pixel values and the h(x,y) values represent the $(x,y)^{th}$ pixel values of the control signal. The result of applying a control signal to an input signal falls into the general category of a non-linear spatial filter if the control signal is derived from a spatial filtered version of the input signal. The avoidance signal a(x,y) is an example of a control signal created from a spatially filtered version of the digital image channel. The texture signal $n_{txt}(x,y)$ described in the preferred embodiment is an example of a non-linear spatial filter produced with the application of a control signal and a digital filter applied to the image channel n(x,y).

Figure 8:
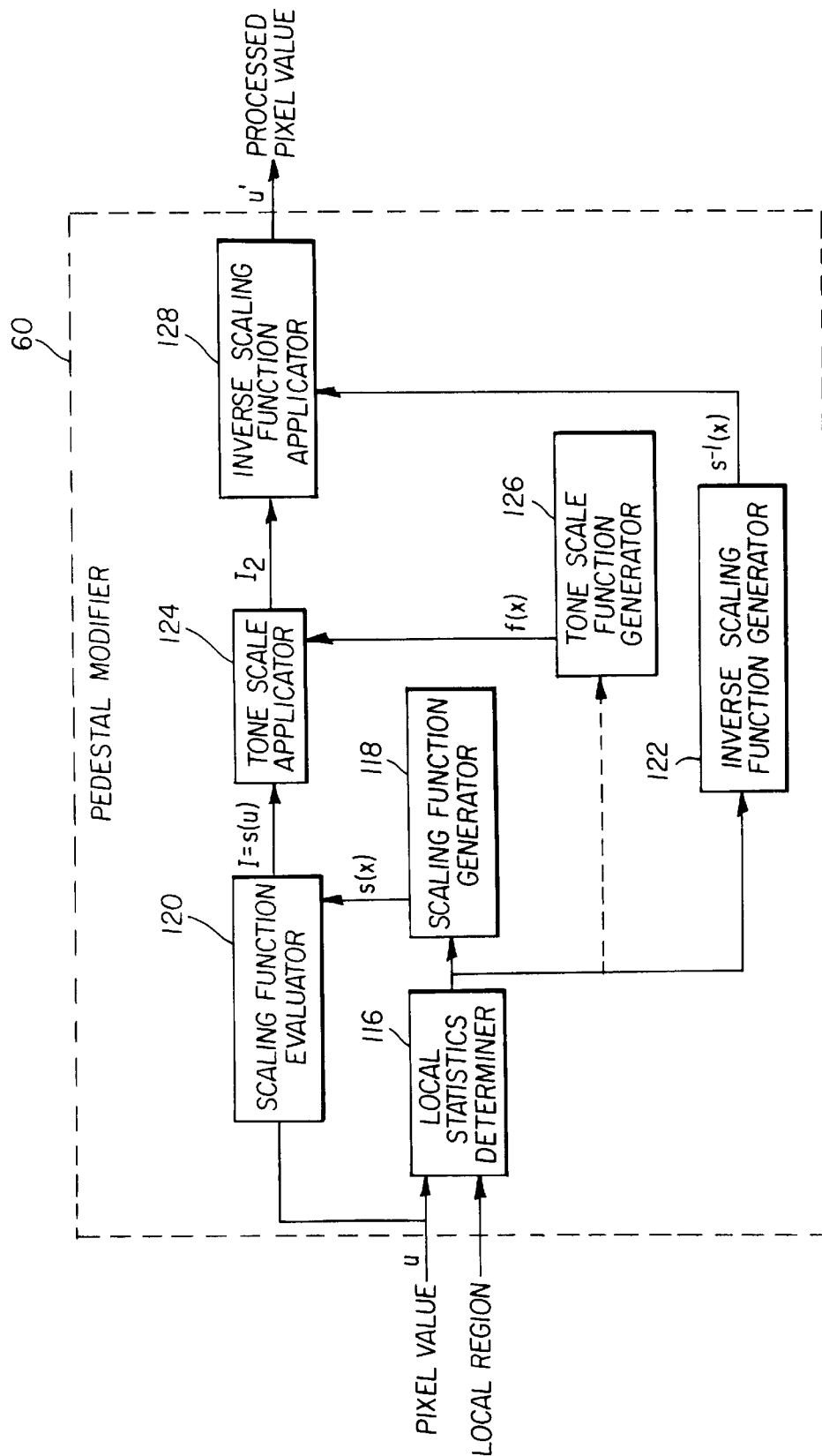
FIG. 8 is a block diagram of the pedestal modifier shown in FIG. 3.

Referring now to FIG. 8, the pedestal modifier 60 shown therein is a sharpening filter algorithm that is adaptive to the morphology of a digital image channel, as based on one or more image characteristics calculated over a localized region of the digital image channel (as isolated by a two-dimensional window). The filtering algorithm includes a stage for normalizing the tone scale conversion with a scaling function for the image statistic(s) over the localized region of a digital image channel and then using the scaled tone scale to reshape the structure of edges in the digital image channel. More specifically, the shape of the local tone scale function is ordinarily selected before processing the image, but the exact scaling and translation of the local tone scale operation is determined from the statistics in any localized region. Accordingly, after the region is isolated, implementation of the algorithm includes identifying a desired statistical characteristic from the local region, performing a local tone scale conversion that is normalized in relation to the statistical characteristic, and mapping the central pixel of the local region through the tone scale conversion to generate an enhanced central pixel value. More detail of the pedestal modifier 60 is described in commonly assigned U.S. Pat. No. 6,580,835 B1 entitled "A Method for Enhancing the Edge Contrast of a Digital Image" and filed Jun. 2, 1999 in the names of A. G. Gallagher and E. B. Gindele, and which is incorporated herein by reference.

The pedestal modifier 60 may be implemented in several modes. More specifically, and particularly as shown in the block diagram of FIG. 8, the pedestal modifier 60 is preferably practiced in a first mode by scaling the input pixel values to the local maximum and minimum for each region and then applying the scaled input values to a tone scale function with normalized coordinates; the output obtained by this conversion operation is then processed with an inverse of the scaling function (used to generate the input) to obtain the enhanced output value. Alternatively, in a second mode of implementing the pedestal modifier 60, a local tone scale is constructed having coordinates that are bounded by the local maximum and minimum for each region, and then each central pixel value is mapped through the bounded coordinates of the tone scale function. This will directly produce the enhanced output value. In a third mode, only the input of the tone scale function is scaled with the inverse scaling function and the output pixel is processed with the inverse of the scaling function; in a fourth mode, only the output of the tone scale function is scaled and the input pixel is processed with the scaling function. In any mode, the shape of the tone scale function may remain fixed over the image; however, it may be desirable to vary the shape of the tone scale function dependent upon the statistical characteristics of the region. Furthermore, while it may be typical to apply the normalized tone scale operation to substantially all the pixels in the input digital image channel, it may be desirable to only apply the method to selected areas of the digital image channel. For details of the second, third and fourth modes, the reader is directed to the aforementioned Ser. No. 09/324,239, which is incorporated herein by reference. These alternative modes provide a processed digital image channel identical to the processed digital image channel obtained by the pedestal modifier 60 disclosed in the preferred embodiment (i.e., the first mode, FIG. 8).

Referring further to FIG. 8, there is illustrated a block diagram of a preferred embodiment for implementing the pedestal modifier 60 according to the first mode as set forth above. It also facilitates understanding to note that the preferred embodiment of the pedestal modifier 60 is described in reference to a relatively high resolution digital image channel having, e.g., dimensions of 1024 pixels in height by 1536 pixels in width, although the invention is similarly operative with image channels having greater or lesser image resolutions. The choice of image resolution, however, may have a concomitant effect on the window size, i.e., while a 5×5 window has been found preferable for 1024×1536 resolution, the choice of a higher resolution image sensor would ordinarily allow a larger window size, and vice versa for a lower resolution sensor.

Figure 9:
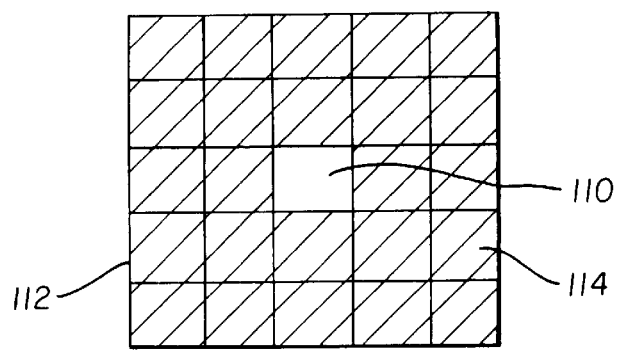
FIG. 9 is an example of a portion of an image showing a central pixel and the associated local region of the image.

With reference also to FIG. 9, the value of each input central pixel 110 of the digital representation of the digital image channel is first passed to a local statistics determiner 116 for calculating local statistics. The values of surrounding pixels 114 included within a local region 112 are also passed to the local statistics determiner 116. The local region 112 and the input pixel 110 constitute a spatial region of the digital image channel. In the preferred embodiment, the local region about each input pixel 110 is defined as a square neighborhood centered on the input pixel for which the local statistics are being determined. In the preferred embodiment, the local region is a square neighborhood with 5 pixels on each side. FIG. 9 illustrates the local region implemented in the preferred embodiment. The pixels 114 included within the local region 112 are illustrated as the 24 pixels (indicated by hatching) surrounding the input pixel 110 passed to the local statistics determiner 116. Those skilled in the art will recognize that the present invention will be operable with a large variety of local region sizes and shapes, and the usage (in this description and as claimed) of the term "central" to describe the processed pixel merely refers to a pixel having a local surround of pixels, rather than a pixel at the centroid of its local region.

In FIG. 8, the value u of each central pixel 110 is input to the local statistics determiner 116 and a scaling function evaluator 120. In addition, the values of the pixels 114 in the local region are input to the local statistics determiner 116 in order to generate a statistical characteristic of the local region. A scaling function generator 118 uses the statistical characteristic to generate a scaling function s(x) that is applied to the scaling function evaluator 120 in order to normalize the value u of each input pixel 110 and thereby generate a first intermediate value I. The statistical characteristic is also used by an inverse scaling function generator 122 to generate a function $s^{-1}(x)$ that is the inverse of the scaling function s(x). The first intermediate value I is then applied to a tone scale applicator 124, which maps the intermediate value I through a tone scale function f(x) provided by a tone scale function generator 126 in order to generate second intermediate value $I_2$. The output intermediate value $I_2$ from the tone scale applicator 124 is then applied to an inverse scaling function applicator 128, which generates a processed value u' in the system image space by using the inverse function $s^{-1}(x)$ provided by the inverse scaling function generator 122.

More specifically, the local statistics determiner 116 calculates several characteristics that describe the image data contained in the local region 112 and the input pixel 110. The local statistics could be any mathematical combination of the pixel values contained in the local region 112 and the input pixel 110. In the preferred embodiment, the local statistics determiner 116 determines two local statistics, the maximum and minimum pixel values from the local region 112 and the input pixel 110. As an alternative, the local statistics determiner 116 could determine the mean of the n maximum pixel values, and the mean of the m minimum pixel values, where n and m are integers much smaller than the number of pixels contained in the local region 112, for example, n=m=3. As will be described, these local statistics are utilized in the generation of the scaling function s(x) and the inverse scaling function $s^{-1}(x)$.

Figure 10:
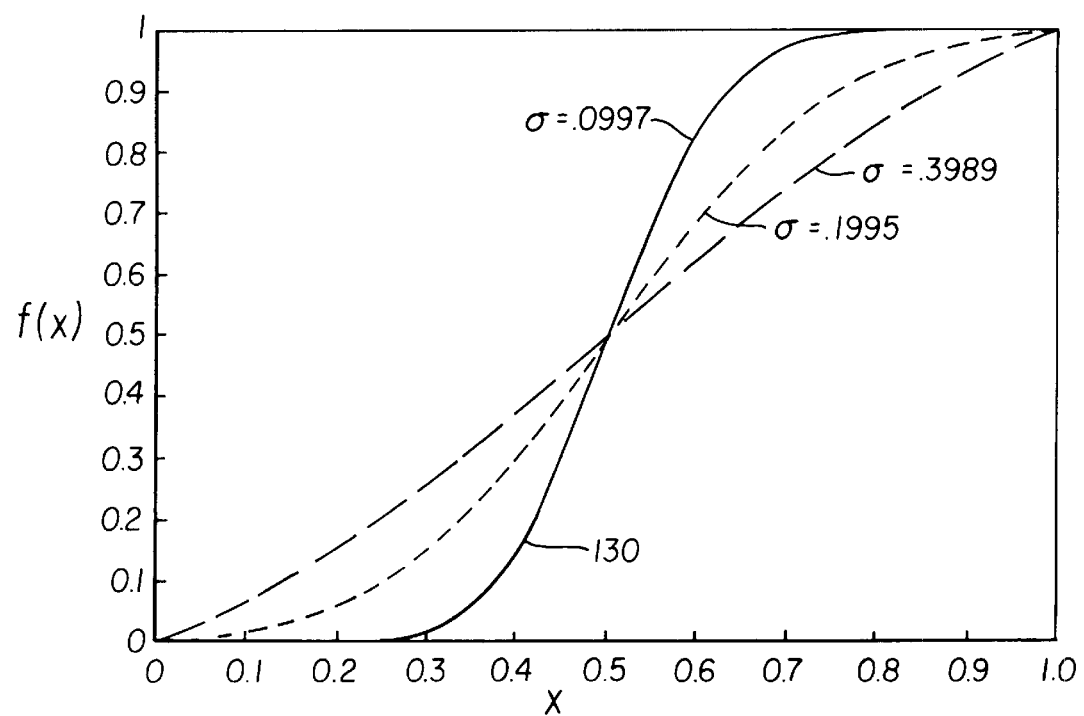
FIG. 10 is an example of several tone scale functions.

The local statistics determined by the local statistics determiner 116 are then passed to the scaling function generator 118 and the inverse scaling function generator 122. In the preferred embodiment, the scaling function may be represented with the following equation:

$$s(u) = \frac{u - N}{X - N}$$

where X represents the maximum pixel value from the local region 112 and N represents the minimum pixel value from the local region 112. The purpose of the scaling function is to modify the value of the central pixel 110 such that the modified pixel value may be used as an input to a tone scale function 130, as shown in FIG. 10. In the preferred embodiment, this tone scale function 130 is applied as a look-up-table (LUT). In the preferred embodiment, the effect of the scaling function is to normalize (i.e., compress) the interval [N X] of input values to an interval [0 1], as shown in FIG. 10.

In a similar manner, the inverse scaling function generator 122 creates the inverse scaling function $s^{-1}(u)$; the inverse scaling function $s^{-1}(u)$ may be represented by the following equation:

$$s^{-1}(u) = u(X-N) + N$$

The purpose of the inverse scaling function is to scale the output values obtained from the tone scale function 130 back to the interval [N X]. The scaling function and the inverse scaling function are indeed inverses, as it can easily be shown that $s^{-1}(s(u))=u$.

The value of the input pixel 110 is then passed to the scaling function evaluator 120 in order to generate an intermediate value I=s(u), where I is the intermediate value, s(x) is the scaling function, and u is the value of the input pixel 110. The output of the scaling function evaluator 120 is the intermediate value I. The intermediate value I is then passed to the tone scale applicator 124. The purpose of the tone scale applicator 124 is to affect the contrast of the value of the input pixel 110 with respect to the local region 112.

The tone scale applicator 124 modifies the intermediate value I, thereby creating the second intermediate value $I_2$. The tone scale applicator 124 modifies the intermediate value I with the tone scale function 130 (i.e., f(x)). Thus, the operation of the tone scale applicator may be expressed in the following equation: $I_2$=f(I), where $I_2$ is the second intermediate value, f(x) is the tone scale function, and I is the intermediate value output from the scaling function evaluator 120.

The tone scale function f(x) is generated by the tone scale function generator 126. In the preferred embodiment, the tone scale function f(x) is the sigmoid function, formed by integrating a Gaussian probability distribution function, and is well known in the art. The sigmoid function is fully characterized by the standard deviation σ of the Gaussian probability function that is integrated. The tone scale function f(x) may be expressed by the following formula:

$$f(x) = \frac{1}{\sigma\sqrt{2\pi}} \int_{-\infty}^{x} \exp\left(\frac{-x^2}{2\sigma^2}\right) dx$$

In the preferred embodiment, the tone scale function is found by computing the summation of discrete samples of a Gaussian distribution, as shown in the following formula:

$$f(x) = \frac{\sum_{u=-a}^{u=a(2x-1)} \exp\frac{-x^2}{2\sigma^2}}{\sum_{u=-a}^{u=a} \exp\frac{-x^2}{2\sigma^2}}$$

where 2a is the number of samples in the LUT. In the preferred embodiment, a=50.

Notice that the slope of the tone scale function f(x) evaluated at x=0.5 may be determined by the relationship:

$$\gamma = \frac{1}{\sigma\sqrt{2\pi}},$$

where γ is the slope of the sigmoid function evaluated at x=0.5, and the approximate slope of the summation described above, and σ is the standard deviation of the Gaussian probability function. When the value of γ>1.0, the operation of the present invention sharpens the digital image channel by reshaping the local structure of edges. When the value of γ is <1.0, the operation of the present invention tends to produce an image with a softer appearance than the input image. In the preferred embodiment γ=2.1 and σ=0.19. In the preferred embodiment, the tone scale function f(x) is independent of the local statistics output from the local statistics determiner 116, and thus need be computed only one time per image channel, despite the number of pixels being processed.

FIG. 10 illustrates a variety of tone scale functions, one of which is shown as the tone scale function 130, and the associated standard deviations of the Gaussian probability function σ. Those skilled in the art will recognize that a wide variety of functions in addition to the sigmoid function will accomplish the goal of the tone scale applicator 124.

The second intermediate value 12 output from the tone scale applicator 124 is passed to the inverse scaling function applicator 128. In addition, the inverse scaling function $s^{-1}$(x) output from the inverse scaling function generator 122 is passed to the inverse scaling function applicator 128.

The purpose of the inverse scaling function applicator 128 is to generate the processed pixel value u' from the second intermediate value $I_2$. The inverse scaling function applicator 128 generates the enhanced pixel value u' by evaluating the inverse scaling function:

$$u'=s^{-1}(I_2)$$

Substituting for $I_2$ and I, $$u'=s^{-1}(f\{s(u)\})$$

where $s^{-1}$(x) represents the inverse scaling function, f{x} represents the tone scale function, s(x) represents the scaling function, u represents the value of the input pixel 110, and u' represents the value of the enhanced pixel. The digital image channel output from the pedestal modified 60 is an enhanced pedestal signal n'$_{ped}$(x,y).

Typically, the process for generating a processed pixel value u' from the pedestal modifier 60 is repeated for every pixel of the digital image channel in order to generate a processed pixel value corresponding to each pixel in the digital image channel. These processed pixel values, when considered as a collection, form a processed digital image channel. Alternatively, the process for generating a processed pixel value u' may repeated for a subset of every pixel of the digital image channel in order to generate a processed pixel value corresponding to a subset of pixels in the digital image channel. In the latter case, the subset, when considered as a collection, forms a processed image for a portion of the channel. In general, the parameters of the present algorithm may be adjusted in order to produce an enhanced digital image channel, with the appearance of greater edge contrast and more clarity than the digital image channel.

The pedestal modifier 60 requires definition of two parameters: the size of the local region (which may be described by a window size for the sharpening filter) and the shape of the tone scale conversion function (which may be described by the slope of the tone scale function). The algorithm tends to perform best when the window size is kept fairly small, e.g., no greater than say about 7×7 pixels for a 1024×1536 imager. Indeed, as the window size and slope of the local tone scale function increase, the image begins to have a "paint-by-number" artifact. Also, a large window tends to compress texture on either side of a large occlusion boundary type edge in an image because the maximum and the minimum tend to occur on opposite sides of the edge. This effect is reduced by keeping the window size relatively small. A window size of 5×5 or fewer pixels has been found generally preferable for producing satisfactory results in typical situations for a 1024×1536 resolution. As mentioned earlier, other suitable window sizes may be empirically determined without difficulty for other image resolutions; alternatively, a larger window may be acceptable in certain situations for a given resolution if the user is willing to accept increased artifacts in order to obtain the sharpening effect of the larger window.

The pedestal modifier as herein described has the advantage of controlling the value of the central pixel in accordance with a statistical characteristic of the region, e.g., driving the value of the central pixel either toward the local maximum or the local minimum of the region, except in the case where the central pixel is substantially midway between the local maximum and the local minimum. Consequently, edge transitions occur over a narrower range of pixels than in the input image, thus generating an image that appears to be sharper, or more in focus, than the original image.

Moreover, since the output of the tone scale conversion is modified by the statistical characteristic, e.g., bounded by the local maximum and the local minimum of the region, systematic overshoot and undershoot at an edge boundary is diminished and the ringing artifact is not as noticeable.

Figure 11:
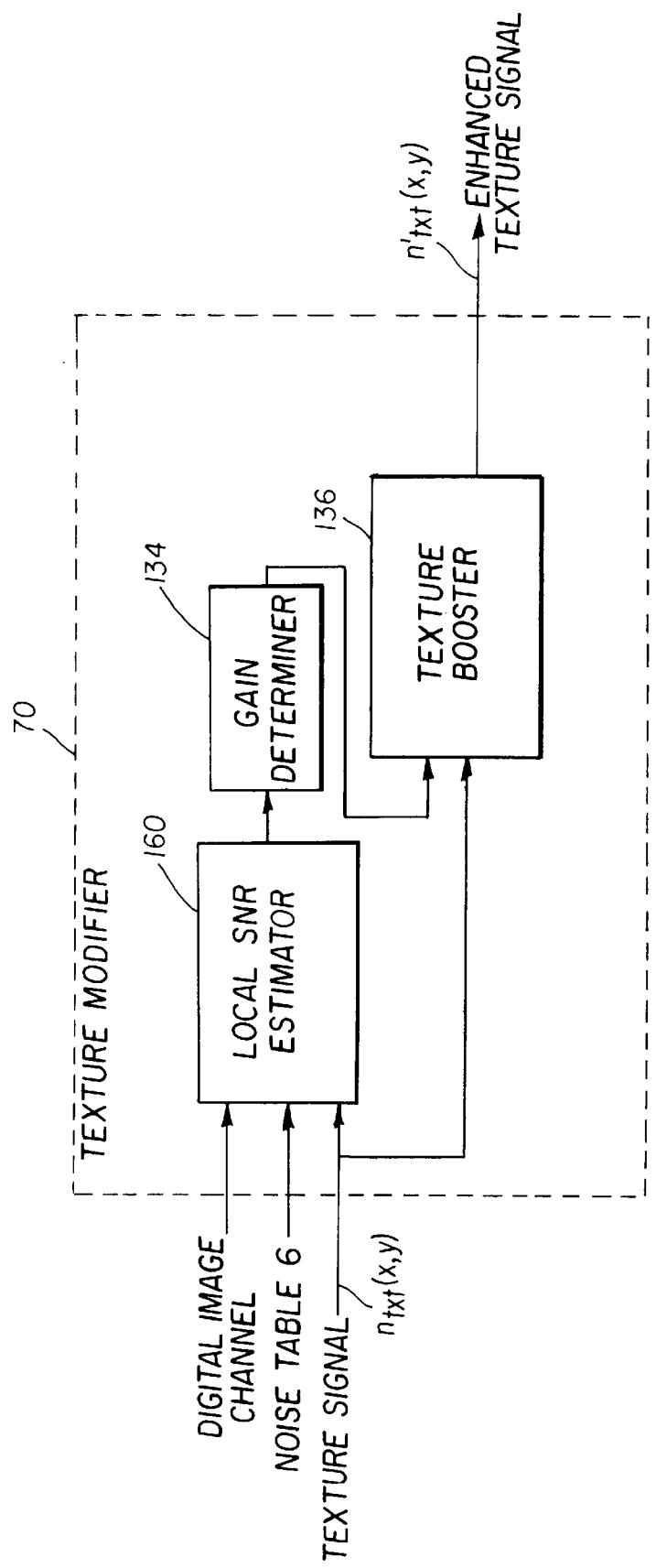
FIG. 11 is a block diagram according to the invention of the texture modifier shown in FIG. 3.

A detailed view of the texture modifier 70 can be seen in FIG. 11 in accordance with the invention. The texture modifier 70 inputs the digital image channel n(x,y), the texture signal $n_{txt}(x,y)$ and the luminance noise table 6. The output of the texture modifier 70 is an enhanced texture signal $n'_{txt}(x,y)$. The purpose of the texture modifier 70 is to boost the texture signal by a factor that is related to an estimate of the local signal to noise (SNR) ratio. Thus, the portion of the texture signal coincident with regions of the digital image channel having high SNR will experience a greater level of boost as compared with the portion of the texture signal associated with low SNR regions of the digital image channel. For example, suppose that an image to be sharpened contains a large region of clear blue sky. The only modulation in this region is likely to be noise resulting from the imaging system. Therefore, it is not desirable to increase to amplitude of this modulation. On the other hand, modulation of a grassy field is a result of the modulation due to many blades of grass in addition to image system noise. In this case, it is preferable to boost the modulation since it can be attributed to actual modulation in the scene. In the present invention, the signal to noise ratio is estimated to act as a classifier that may be used to distinguish between, e.g., the two aforementioned types of regions in a scene.

In this regard, the digital image channel n(x,y), the texture signal $n_{txt}(x,y)$ and the luminance noise table 6 are input to a local SNR estimator 160. The purpose of the local SNR estimator 160 is to estimate the local signal to noise ratio which will later be used to determine the level of boost given to a specific pixel of the texture signal. In the preferred embodiment, the output of the local SNR estimator 160 is one estimate of the SNR for each pixel in the digital image channel, represented by the symbol SNR(x,y). However, it is also possible that the SNR may be calculated for only a subset of the pixels' locations of the digital image channel. The local SNR estimator 160 will be described in greater detail hereinbelow.

The output of the local SNR estimator 160, SNR(x,y), is passed into a gain determiner 134. The gain determiner 134 is meant to determine an individual level of boost B(x,y) to apply at each particular (x,y) location of the texture signal, given that an estimate of the local SNR is known. This is accomplished by the use of a look up table (LUT), for example the LUT shown as a plot in FIG. 15. In the preferred embodiment, this LUT is monotonically increasing. The LUT output (the gain) increases with the increase of the LUT input (the estimate of the SNR.)

Figure 15:
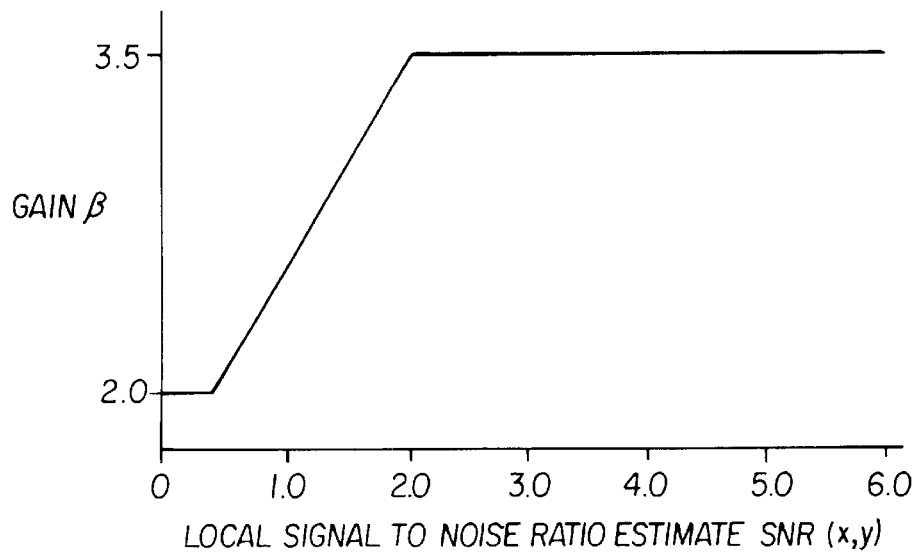
FIG. 15 is a plot of a look up table (LUT) used by the gain determiner shown in FIG. 11.

The equation for the LUT shown in FIG. 15 is given as:

$$B(x,y) = sf_{min} \text{ for } SNR(x,y) < SNR_{min}$$

$$B(x,y) = sf_{min} + (sf_{max} - sf_{min})(SNR(x,y) - SNR_{min})/(SNR_{max} - SNR_{min}) \text{ for } SNR_{min} < SNR(x,y) < SNR_{max}$$

$$B(x,y) = sf_{max} \text{ for } SNR(x,y) > SNR_{max}$$

Where $sf_{max}$ is $\geq sf_{min}$, and $SNR_{max} \geq SNR_{min}$. In the preferred embodiment, $sf_{max}$ is 3.5, $sf_{min}$ is 2.0, $SNR_{max}$ is 2.0 and $SNR_{min}$ is 0.4.

The gain B(x,y) output by the gain determiner 134 and the texture signal $n_{txt}(x,y)$ are then both passed to a texture booster 136. The purpose of the texture booster 136 is to multiply each value of the texture signal $n_{txt}(x,y)$ by its associated gain. The output of the texture booster 136 is the enhanced texture signal $n'_{txt}(x,y)$, given by the equation:

$$n'_{txt}(x,y) = n_{txt}(x,y) * B(x,y).$$

This enhanced texture signal $n'_{txt}(x,y)$ output from the texture modifier 70 is then passed to the adder 80 in FIG. 3 (or to the avoidance adder 81 in the case of the alternative embodiment shown in FIG. 4.) Note that when B(x,y)<1.0, the magnitude of the enhanced signal is less than the magnitude of the original texture signal $|n_{txt}(x,y)| > n'_{txt}(x,y)|$. Thus, if the present invention is tuned such that in noisy regions, B(x,y)<1.0, the processed digital image channel will appear to have less noise than the digital image channel input to the preference sharpener 2.

Figure 12:
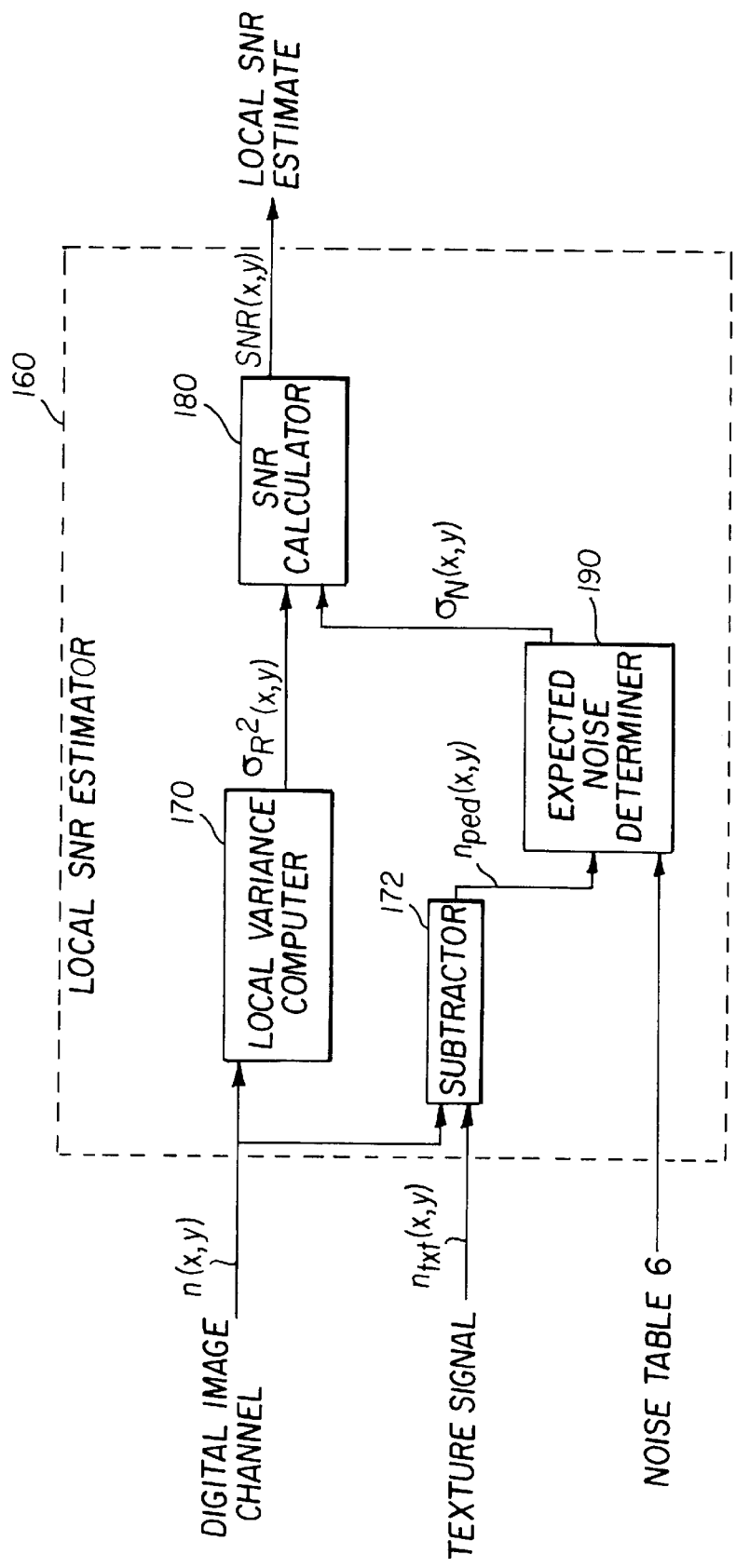
FIG. 12 is a block diagram of a first embodiment of the local SNR estimator shown in FIG. 11.

A detailed block diagram of the local SNR estimator 160 may be seen in FIG. 12. The digital image channel n(x,y) is first input to a local variance computer 170. The purpose of the local variance computer 170 is to attain a local estimate of signal activity. In the preferred embodiment, the local variance computer 170 calculates the local variance $\sigma_R^2(x,y)$ over a window of size W by W pixels. In the preferred embodiment W=7 pixels, although it has been determined that alternately sized windows perform the task with nearly equivalent results.

The computation of the local variance of a set of values is well known in the art, and may be expressed as:

$$\sigma_R^2(x,y) = \Sigma p(x+i,y+j)^2/W^2 - (\Sigma p(x+i,y+j)/W^2)^2$$

Where i and j both range from −3 to +3, inclusive, for a total of $W^2=49$ pixels included in the computation of the variance $\sigma_R^2(x,y)$. Calculation of the variance at edges involves mirroring, a technique well known in the art of image processing. The output of the local variance computer 170 is a local variance for each pixel in the digital image channel.

A subtractor 172 inputs both the digital image channel n(x,y) and the texture signal $n_{txt}(x,y)$. The output of the subtractor 172 is the pedestal signal $n_{ped}(x,y)$. The subtractor 172 determines the pedestal signal by subtracting the texture signal $n_{txt}(x,y)$ from the digital image channel n(x,y), according to the formula:

$$n_{ped}(x,y) = n(x,y) - n_{txt}(x,y)$$

Note that this pedestal signal $n_{ped}(x,y)$ is identical to the pedestal signal determined by the pedestal splitter 50. In a practical implementation of the present invention, the pedestal signal need only be computed once.

The noise table 6 and the pedestal signal $n_{ped}(x,y)$ are input an expected noise determiner 190. The noise table contains the relationship between expected noise $\sigma_N(i)$ and intensity i of the digital image channel n(x,y). In the preferred embodiment, the noise table is a two column table, a sample of which is shown hereinbelow in a two column list. The first column represents intensity level and the second column represents the expected standard deviation of noise for that intensity level.

| i | $\sigma_N(i)$ |
| --- | --- |
| 0 | 11.5 |
| 100 | 11.5 |
| 450 | 11.9 |
| 550 | 12.0 |
| 650 | 12.1 |
| 750 | 12.2 |

-continued

| i | $\sigma_N(i)$ |
|---|---|
| 850 | 12.3 |
| 950 | 12.4 |
| 1050 | 12.3 |
| 1150 | 12.3 |
| 1250 | 12.3 |
| 1350 | 12.4 |
| 1450 | 12.4 |
| 1550 | 12.2 |
| 1650 | 11.9 |
| 1750 | 11.5 |
| 1850 | 11.4 |
| 1950 | 11.6 |
| 2050 | 12.1 |
| 2150 | 12.8 |
| 2250 | 13.8 |
| 2350 | 15.0 |
| 2450 | 16.4 |
| 2550 | 17.9 |
| 2650 | 19.9 |

The noise table may also be specified in terms of a four column table, where the first column is the intensity i, and the second to fourth columns correspond to the standard deviations of noise expected in the red, green, and blue channels, respectively, of the digital image channel input to the preference sharpener 2. In this case, the expected standard deviation of noise for intensity level i of the luminance channel n(x,y) is dependent upon the coefficients of the color rotation matrix used to generate the luminance channel, as given by:

$$\sigma_n(i) = sqrt((\sigma_r(i)*rcoef)^2 + (\sigma_g(i)*gcoef)^2 + (\sigma_b(i)*bcoef)^2))$$

where $\sigma_n(i)$ is the expected standard deviation of noise at intensity i for the luminance digital image channel n(x,y). Likewise, $\sigma_r(i)$, $\sigma_g(i)$, $\sigma_b(i)$ are the expected standard deviations of noise of the respective red, green, and blue digital image channels at intensity i, and rcoef, gcoef, and bcoef are the coefficients of the color rotation matrix used to generate the luminance digital image channel n(x,y). As previously mentioned, in the preferred embodiment all three of these coefficients equal ⅓. Consequently, the luminance channel given in the preferred embodiment is given by:

$$\sigma_n(i) = \frac{1}{3} * sqrt(\sigma_r(i)^2 + \sigma_g(i)^2 + \sigma_b(i)^2)$$

Thus a noise table corresponding to the luminance digital image channel n(x,y) may be either supplied or calculated by the expected noise determiner 190.

The expected noise determiner 190 outputs an intensity dependent estimate of the standard deviation of noise $\sigma_N(x,y)$ for the intensity level of the pedestal signal $n_{ped}(x,y)$. The expected noise determiner 190 either performs a table lookup, which relates the intensity of the pedestal signal to the expected standard deviation of noise $\sigma_N(x,y)$, or calculates the expected noise, as described above. The output $\sigma_N(x,y)$ of the expected noise determiner 190 may be represented as:

$$\sigma_N(x,y) = \sigma_N(n_{ped}(x,y)).$$

If the value of $n_{ped}(x,y)$ is not coincident with a value of i for which $\sigma_n(i)$ exists, then linear interpolation is used to determine a value for $\sigma(n_{ped}(x,y))$. Linear interpolation is well known in the art and will not be further discussed. A plot of a noise table can be seen in FIG. 14.

Figure 14:
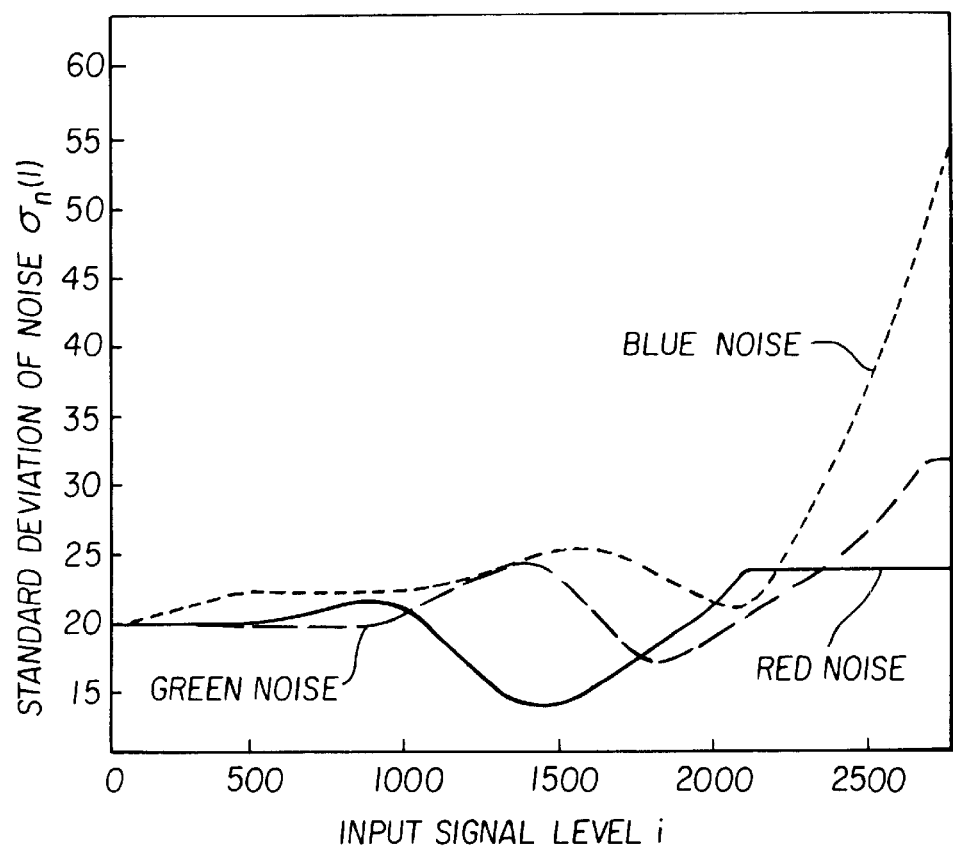
FIG. 14 is a plot of a function used to generate a noise table.

The procedure for generating a noise table such as the one illustrated in FIG. 14 can be found in U.S. Pat. No. 5,641, 596 issued Jun. 24, 1997 to Gray et al. or in U.S. Pat. No. 5,923,775 issued Jul. 13, 1999 to Snyder et al., both of which are incorporated herein by reference.

An SNR calculator 180 inputs both the expected standard deviation of noise $\sigma_N(x,y)$ output from the expected noise determiner 190, and the local variance $\sigma_R(x,y)$ output from the local variance computer 170. The SNR calculator 180 estimates a local signal to noise ratio SNR(x,y) by computing the ratio of the signal variance (assuming that the local variance $\sigma_R^2(x,y)$ is the sum {in an RMS sense} of the variance due to signal and the variance due to noise.) Thus, the output of the SNR calculator 180 is an estimate of the local SNR at each pixel location, according to the following formula:

$$SNR(x,y) = sqrt(\sigma_R^2(x,y) - \sigma_N^2(x,y))/\sigma_N(x,y).$$

Note that before attempting the square root operation, the value of $\sigma_R^2(x,y) - \sigma_N^2(x,y)$ is checked to ensure that it is positive. If it is not, the value of SNR (x,y) is set to equal 0.0.

Figure 13:
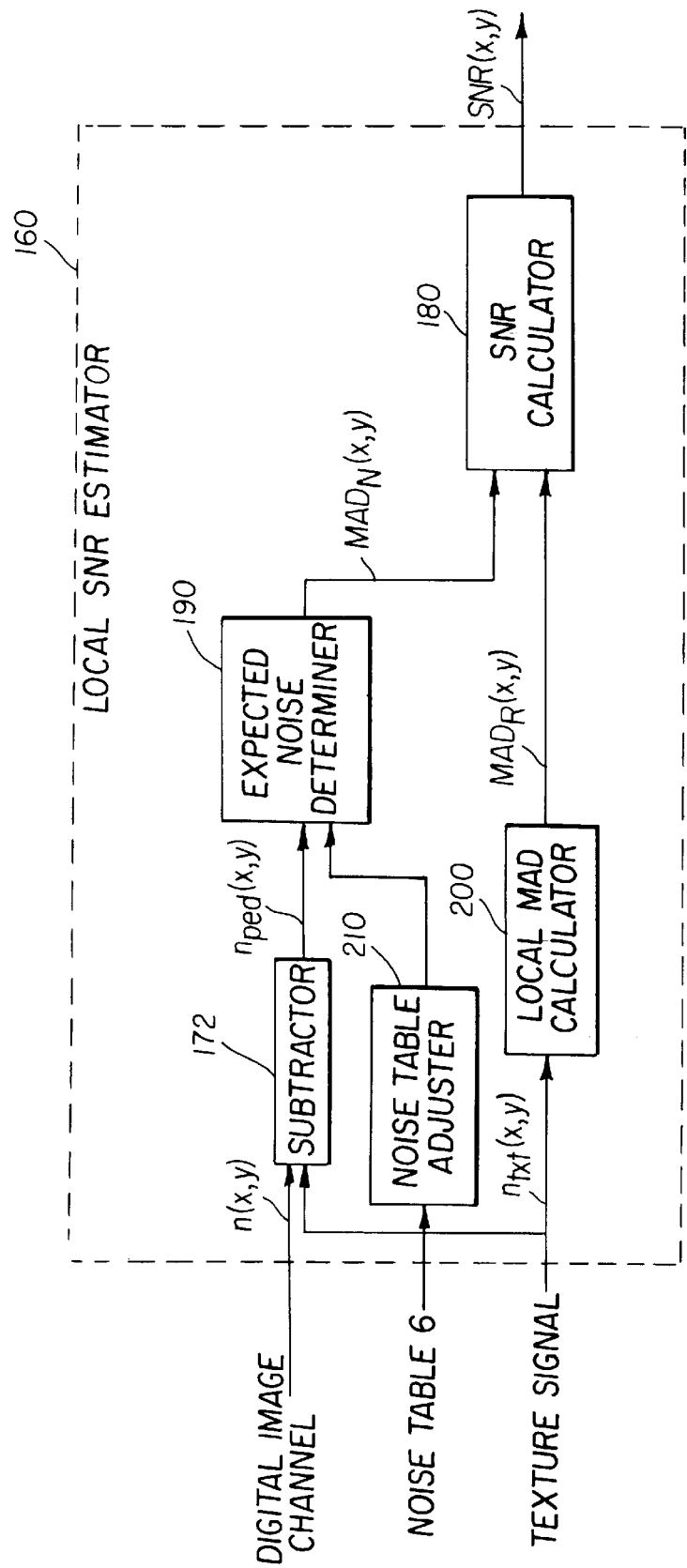
FIG. 13 is a block diagram of a second embodiment of the local SNR estimator shown in FIG. 11.

Notice that many other estimates of the signal to noise ratio may be formulated without deviating from the spirit of the present invention. For example, an alternative embodiment of the local SNR estimator 160 is shown in FIG. 13. The purpose of this embodiment is to provide an estimate of the local SNR by a means that is computationally less expensive that by that shown in FIG. 12. In this alternative embodiment, the noise and signal deviation are both assumed to be Gaussian distributed, which allows for the use of mean absolute deviation (MAD) rather than standard deviation. The calculation of mean absolute deviation does not involve the computationally expensive square root and squaring operations. In this embodiment, the texture signal $n_{txt}(x,y)$ and the digital image channel n(x,y) are again input to the subtractor 172 for the purpose of producing the pedestal signal $n_{ped}(x,y)$, as previously described. The pedestal signal $n_{ped}(x,y)$ will again be used as an input to the expected noise determiner 190 to determine the value of $\sigma_N(x,y)$.

The texture signal $n_{txt}(x,y)$ is input to the local MAD calculator 200 in order to determine the local mean absolute deviation in the texture signal. By assuming that the mean value of the texture signal $n_{txt}(x,y)$ is 0, the formula for computing the local MAD used by the local MAD calculator 200 is given as:

$$MAD_R(x,y) = \Sigma |n_{txt}(x+i,y+j)|/W^2$$

where i and j preferably both range from −3 to +3, for a total of $W^2 = 49$ pixels included in the calculation of the mean absolute deviation. The local MAD calculator 200 outputs the value of the mean absolute deviation $MAD_R(x,y)$, which will later be used in calculations necessary for determining the estimate of the local SNR.

The purpose of a noise table adjuster 210 is to compensate for the differences between calculating $MAD_R(x,y)$ of the texture signal, and calculating the standard deviation $\sigma_R(x,y)$ of the digital image channel. The noise table adjuster 210 modifies the luminance noise table for the purpose of using mean absolute deviation, rather than standard deviation. Assuming, as previously mentioned, that the luminance noise table contains the relationship between expected noise $\sigma_n(i)$ and intensity i, It is known in the art that the MAD of a Gaussian distribution is related to the standard deviation $\sigma$ of that distribution by the following relationship:

$$MAD = sqrt(2/\pi)\sigma$$

Thus, in order to translate the luminance noise table from the metric of standard deviation to the metric of MAD, each value of $\sigma_n(i)$ must be scaled by about 0.8.

In addition, there is the difference between this alternative embodiment and the preferred embodiment concerning which signal is used for computation of the local signal activity measure. In the preferred embodiment, the variance of the digital image channel is computed. In this alternative embodiment, the texture signal is used to calculate the value of $MAD_R(x,y)$, providing a computational benefit when the signal mean is assumed to be zero. Thus the relationship of the texture signal $n_{txt}(x,y)$ to the digital image channel $n(x,y)$ must be understood in order to adjust the luminance noise table to account for this. This relationship can be easily expressed only if the digital filtering process used to generate the texture signal is linear. For the sake of this step, the effects of the artifact avoidance signal are ignored, and the texture signal is assumed to be equivalent to the highpass signal. For a general (n x m) filter with coefficients $h(i,j)$, wherein $i=-(n-1)/2, -(n-3)/2, \ldots, n-1/2$ and $j=-(m-1)/2, -(m-3)/2, \ldots, m-1/2$, the variance of the filtered signal is related to the variance of the original signal by the following relationship:

$$\sigma^2_{fs} = \sigma^2_{os} \Sigma\Sigma h^2(i,j)$$

where $\sigma^2_{fs}$ represents the variance of the filtered signal, $\sigma^2_{os}$ represents the variance of the original signal, and the summation occurs over i and j.

Thus, in the case of the present invention, the filter $h(i,j)$ is assumed to be expressed as:

$$h(i,j) = \delta(i,j) - g(i,j)$$

where $\delta(i,j)$ is the delta function which has a value of one at $i=0$ and $j=0$ and a value of zero everywhere else. This expression accounts for the previously described process of generating the texture signal (ignoring the artifact avoidance signal) by blurring the digital image channel with a Gaussian filter $g(i,j)$, then subtracting the result from the digital image channel. Thus, considering this description, the noise table adjuster 210 must scale each value of the luminance noise table by a factor to account for the estimation of local signal activity on the texture signal rather than the digital image channel. This factor f can be expressed as:

$$f = sqrt(\Sigma\Sigma h(i,j)^2)$$

where the summation occurs over i and j, and $h(i,j)$ is as previously described. The square root of the result is taken because the luminance noise table is in the units of standard deviation, rather than variance.

Thus, the operation of the noise table adjuster 210 is to scale each entry $\sigma_n(i)$ of the luminance noise table by a factor m equal to $$m = f*sqrt(2/\pi)$$

in order to compensate for the calculation of MAD rather than standard deviation, and the calculation with the texture signal rather then the digital image channel.

The modified noise table output from the noise table adjuster 210 is passed as an input to the expected noise determiner 190 for the purpose of attaining an estimate of the expected MAD from noise, $MAD_N(x,y)$. The expected noise determiner 190 uses the modified noise table to determine the value of $MAD_N(x,y)$ for each value of $n_{ped}(x,y)$. The output of the expected noise determiner 190 is the value of $MAD_N(x,y)$ at each location of the digital image channel.

The SNR calculator 180 of the alternative embodiment shown in FIG. 13 acts essentially the same as the SNR calculator 180 of the preferred embodiment. The purpose of the SNR calculator 180 is to output a value of estimated SNR at each location of the digital image channel. To this end, the SNR calculator 180 calculates the following formula:

$$SNR(x,y) = sqrt(MAD_R(x,y)^2 - MAD_N(x,y)^2)/MAD_N(x,y)$$

The estimate of the local SNR is output from the local SNR estimator 160 and input to the gain determiner 134, shown in FIG. 11 in order to allow for the determination of the appropriate boost factor for the texture signal at each location.

In summary, the use of the pedestal splitter 50, decomposing the image into a signal containing the image detail and another signal primarily containing the large image edges, allows for independent control of the enhancement applied to edges and texture. Edges are reshaped by a morphological operation in order to increase edge contrast and avoid boundary artifacts. Texture in enhanced with regard to an estimate of the local signal to noise ratio.

The present invention has been described with reference to a preferred embodiment. Changes may be made to the preferred embodiment without deviating from the scope of the present invention. For instance, in the preferred embodiment, a calculation of the local SNR is made for each pixel of the digital image channel. However, it is conceivable that the calculation of the SNR could be made for only every $N^{th}$ pixel in order to reduce computational cost, and replicated or interpolated. Calculation of the local SNR was described with reference to a local variance calculation on the digital image channel $n(x,y)$. Additionally, an alternative embodiment described a method by which local SNR may be estimated based upon using a MAD calculation upon the texture signal $n_{txt}(x,y)$. Those skilled in the art will recognize that the local SNR may also be estimated by performing a variance calculation on the texture signal, or by performing a MAD calculation upon the digital image channel $n(x,y)$. Such modifications to the preferred embodiment do not significantly deviate from the scope of the present invention.

| PARTS LIST | |
| --- | --- |
| 2 | preference sharpener |
| 6 | noise table |
| 10 | luminance/chrominance converter |
| 11a | luminance line |
| 11b | noise table line |
| 11c | chrominance line |
| 20 | sharpening processor |
| 30 | RGB converter |
| 40 | chrominance processor |
| 50 | pedestal splitter |
| 50A | alternative pedestal splitter |
| 60 | pedestal modifier |
| 70 | texture modifier |
| 80 | adder |
| 81 | avoidance adder |
| 90 | texture signal generator |
| 94 | frequency splitter |
| 100 | pedestal generator |
| 104 | avoidance signal generator |
| 106 | gradient calculator |
| 108 | artifact avoidance function applicator |
| 110 | input central pixel |
| 112 | local region |
| 114 | surrounding pixels |
| 116 | local statistics determiner |
| 118 | scaling function generator |
| 120 | scaling function evaluator |

-continued

PARTS LIST

| | | |
|---|---|---|
| 122 | inverse scaling function generator | |
| 124 | tone scale applicator | |
| 126 | tone scale function generator | |
| 128 | inverse scaling function applicator | |
| 130 | tone scale function | |
| 134 | gain determiner | |
| 136 | texture booster | |
| 160 | local SNR estimator | |
| 170 | local variance computer | |
| 172 | subtractor | |
| 180 | SNR calculator | |
| 190 | expected noise determiner | |
| 200 | local MAD calculator | |
| 210 | noise table adjuster | |

What is claimed is:

1. A method for enhancing a digital image channel comprised of a plurality of image pixels, said method comprising the steps of:

providing a predetermined estimate of the noise expected for the digital channel based on a predetermined relationship between the image intensity values and expected noise for given intensities;

generating a local estimate of signal activity for the digital image channel;

generating a gain adjustment from the predetermined estimate of noise provided in said providing step and the local estimate of signal activity generated in said first generating step;

applying the gain adjustment to the image pixels in the digital channel in order to generate a digital channel with enhanced image values;

splitting the digital image channel into first and second channels that substantially comprise the digital image channel, said first and second channels each characterized by image intensity values corresponding to the image pixels;

providing image values from the second channel corresponding to image pixels from a region of the image:

identifying a statistical characteristic of the image pixels in the region;

normalizing a predetermined tone scale conversion for the statistical characteristic in order to generate a normalized tone scale conversion; and performing the normalized tone scale conversion on a central pixel of the region to generate a second channel with enhanced image values; and combining the first channel and the second channel with enhanced image values to generate an enhanced digital image channel.

2. The method of claim 1 wherein the predetermined estimate of noise is provided in the form of a noise table and said step of providing a predetermined estimate performs a table lookup to find the predetermined estimate of noise.

3. The method of claim 1 wherein said step of generating a local estimate further comprises:

providing image intensity values from the digital image channel corresponding to image pixels from a region of the image; and generating a local estimate of signal activity in the region.

4. The method of claim 3 wherein the local estimate of signal activity is a local variance calculated over the region.

5. The method of claim 3 wherein the local estimate of signal activity is a local variance calculated over the region, and the region comprises a 7×7 or smaller array of image pixels.

6. The method as claimed in claim 1 wherein said step of generating a gain adjustment further comprises;

generating a local signal to noise ratio (SNR) value from said predetermined estimate of noise and said local estimate of signal activity; and generating a gain adjustment for each image pixel from the local SNR value.

7. The method as claimed in claim 1 wherein said local estimate of signal activity is a mean absolute deviation of the digital channel.

8. A method for enhancing a digital image channel comprised of a plurality of image pixels, said method comprising the steps of:

(a) splitting the digital image channel into first and second channels that substantially comprise the digital image channel, said first and second channels each characterized by image intensity values corresponding to the image pixels;

(b) providing a predetermined estimate of the noise expected for the digital channel based on a predetermined relationship between the image intensity values and expected noise for given intensities;

(c) generating a local estimate of signal activity for the digital image channel;

(d) generating a gain adjustment from the predetermined estimate of noise provided in step (b) and the local estimate of signal activity generated in step (c);

(e) applying the gain adjustment to the image pixels in the first channel in order to generate a first channel with enhanced image values;

(f) combining the first channel with enhanced image values and the second channel to generate an enhanced digital image channel; and (g) modifying the second channel prior to said combining, said modifying comprising the steps of:

providing image values from the second channel corresponding to image pixels from a region of the image:

identifying a statistical characteristic of the image pixels in the region;

normalizing a predetermined tone scale conversion for the statistical characteristic in order to generate a normalized tone scale conversion; and performing the normalized tone scale conversion on a central pixel of the region to generate a second channel with enhanced image values.

9. A method for enhancing a digital image channel comprised of a plurality of image pixels, said method comprising the steps of:

(a) splitting the digital image channel into first and second channels that substantially comprise the digital image channel, said first and second channels each characterized by image intensity values corresponding to the image pixels;

(b) providing a predetermined estimate of the noise expected for the digital channel based on a predetermined relationship between the image intensity values and expected noise for given intensities;

(c) generating a local estimate of signal activity for the digital image channel;

(d) generating a gain adjustment from the predetermined estimate of noise provided in step (b) and the local estimate of signal activity generated in step (c);

(e) applying the gain adjustment to the image pixels in the first channel in order to generate a first channel with enhanced image values; and (f) combining the first channel with enhanced image values and the second channel to generate an enhanced digital image channel;
wherein step (d) further comprises;
(d1) generating a local signal to noise ratio (SNR) value from the predetermined estimate of noise provided in step (b) and the local estimate of signal activity generated in step (c);
(d2) generating a gain adjustment for each image pixel from the local SNR value.

10. The method of claim 9, wherein the first channel is characteristic of texture in the digital image channel and the second channel is a pedestal signal characteristic of edges in the digital image channel.

11. The method of claim 10, wherein step (b) provides an estimate of the noise expected in the pedestal signal.

12. The method of claim 9, wherein the predetermined estimate of noise is provided in the form of a noise table and step (b) performs a table lookup to find the predetermined estimate of noise.

13. The method of claim 9 wherein step (c) further comprises:
(c1) providing image intensity values from the digital image channel corresponding to image pixels from a region of the image; and
(c2) generating a local estimate of signal activity in the region.

14. The method of claim 13 wherein the local estimate of signal activity estimated in step (c1) is a local variance calculated over the region.

15. The method of claim 13 in which the region of step (c1) comprises a 7×7 or smaller array of image pixels.

16. The method of claim 9, which the second channel is modified in a further step (g) before it is combined with the first channel.

17. A method for enhancing a digital image channel comprised of a plurality of image pixels, said method comprising the steps of:
(a) splitting the digital image channel into first and second channels that substantially comprise the digital image channel, said first and second channels each characterized by image intensity values corresponding to the image pixels;
(b) providing a predetermined estimate of the noise expected for the digital channel based on a predetermined relationship between the image intensity values and expected noise for given intensities;
(c) generating a local estimate of signal activity for the digital image channel;
(d) generating a gain adjustment from the predetermined estimate of noise provided in step (b) and the local estimate of signal activity generated in step (c);
(e) applying the gain adjustment to the image pixels in the first channel in order to generate a first channel with enhanced image values;
(f) combining the first channel with enhanced image values and the second channel to generate an enhanced digital image channel; and
(g) modifying the second channel before it is combined with the first channel;
wherein the modifying of the second channel in the step (g) comprises the steps of:
(g1) providing a predetermined tone scale conversion to enhance the digital image channel;
(g2) providing image values from the second channel corresponding to image pixels from a region of the image:
(g3) identifying a statistical characteristic of the image pixels in the region;
(g4) normalizing the predetermined tone scale conversion for the statistical characteristic in order to generate a normalized tone scale conversion; and
(g5) performing the normalized tone scale conversion on a central pixel of the region in order to generate a second channel with enhanced image values.

18. The method of claim 17 in which the second channel comprises a pedestal signal characteristic of edges in the digital image channel and the first channel comprises a texture signal characteristic of texture in the digital image channel.

19. The method of claim 17 in which the region of step (g2) comprises providing image pixels from a two dimensional region distributed around the central pixel.

20. The method of claim 19 in which the region of step (g2) comprises a 5×5 or smaller array of image pixels.

21. The method of claim 17 in which step (g3) comprises determining a gradient value within the region.

22. The method of claim 21 in which the gradient value is derived from a maximum and a minimum value for the region.

23. The method of claim 22 in which the gradient value is computed from the difference between maximum and minimum image values of image pixels within the region.

24. The method of claim 22 in which the gradient value is computed from the difference between average maximum and minimum values across respective pluralities of image pixels comprising portions of the region.

25. A computer program product for enhancing a digital image channel comprised of a plurality of image pixels, said computer program product comprising: a computer readable storage medium having a computer program stored thereon for performing the steps of:
providing a predetermined estimate of the noise expected for the digital channel based on a predetermined relationship between the image intensity values and expected noise for given intensities;
generating a local estimate of signal activity for the digital image channel;
generating a gain adjustment from the predetermined estimate of noise provided in said providing step and the local estimate of signal activity generated in said first generating step; and
applying the gain adjustment to the image pixels in the digital channel in order to generate a digital channel with enhanced image values;
splitting the digital image channel into first and second channels that substantially comprise the digital image channel, said first and second channels each characterized by image intensity values corresponding to the image pixels;
providing image values from the second channel corresponding to image pixels from a region of the image:
identifying a statistical characteristic of the image pixels in the region;
normalizing a predetermined tone scale conversion for the statistical characteristic in order to generate a normalized tone scale conversion; and
performing the normalized tone scale conversion on a central pixel of the region to generate a second channel with enhanced image values; and combining the first channel and the second channel with enhanced image values to generate an enhanced digital image channel.

26. The computer program product of claim 25 wherein the predetermined estimate of noise is provided in the form of a noise table and said step of providing a predetermined estimate performs a table lookup to find the predetermined estimate of noise.

27. The computer program product of claim 25 wherein said step of generating a local estimate further comprises:

providing image intensity values from the digital image channel corresponding to image pixels from a region of the image; and generating a local estimate of signal activity in the region.

28. The computer program product of claim 27 wherein the local estimate of signal activity is a local variance calculated over the region.

29. The computer program product of claim 27 in which the region of said step of providing image intensity values comprises a 7×7 or smaller array of image pixels.

30. The computer program product of claim 25 wherein said step of generating a gain adjustment further comprises;

generating a local signal to noise ratio (SNR) value from said predetermined estimate of noise and said local estimate of signal activity; and generating a gain adjustment for each image pixel from the local SNR value.

* * * * *